(12) United States Patent
Shiono et al.

(10) Patent No.: US 6,487,016 B1
(45) Date of Patent: *Nov. 26, 2002

(54) OPTICAL HEAD

(75) Inventors: Teruhiro Shiono, Osaka (JP); Tetsuo Saimi, Osaka (JP)

(73) Assignee: Matsushita Electric Industrial Co., Ltd., Kadoma (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/129,276

(22) Filed: Aug. 5, 1998

(30) Foreign Application Priority Data

Aug. 26, 1997 (JP) .............................................. 9-230057

(51) Int. Cl.⁷ ......................... G02B 27/44; G02B 5/18; G02B 6/34
(52) U.S. Cl. ........................ 359/566; 359/571; 385/37
(58) Field of Search ................................. 359/566, 571; 385/14, 7, 37; 369/112, 44.37, 44.11, 44.12, 103, 109, 110

(56) References Cited

U.S. PATENT DOCUMENTS

| 4,907,850 A | * | 3/1990 | Araki et al. ................... 385/1 |
| 4,938,550 A | * | 7/1990 | Inagaki et al. ................. 359/17 |
| 5,070,488 A | * | 12/1991 | Fukushima et al. ......... 369/103 |
| 5,124,841 A | * | 6/1992 | Oishi .......................... 359/487 |
| 5,751,682 A | * | 5/1998 | Hasegawa ................... 369/112 |
| 5,777,971 A | * | 7/1998 | Choi .......................... 369/112 |
| 5,978,344 A | * | 11/1999 | Horinouchi ................. 369/112 |

FOREIGN PATENT DOCUMENTS

JP          63-74134         4/1988

* cited by examiner

*Primary Examiner*—Cassandra Spyrou
*Assistant Examiner*—Jennifer Winstedt
(74) *Attorney, Agent, or Firm*—Merchant & Gould P.C.

(57) ABSTRACT

An optical head comprises a light path alteration member (first surface of a first transparent substrate), a first grating element and a second grating element arranged in that order in a light path between a light source and an optical disk. A beam emitted by the light source passes a collimated lens, is deflected by total reflection from the light path alteration member, and enters the first grating element. Diffracted light enters a second grating element, and is focused on a recording medium by an objective lens. Wavelength variations in light diffracted by the first grating element and wavelength variations in light diffracted by the second grating element at least partially cancel each other out. Thus, a thin optical head for an optical recording medium is provided.

34 Claims, 29 Drawing Sheets

OPTICAL HEAD

FIELD OF THE INVENTION

The present invention relates to an optical head for an optical recording and reading medium, and in particular, to devising a thinner optical head.

BACKGROUND OF THE INVENTION

Optical heads are important structural components for reading signals from optical recording media such as compact disks (CDs) or digital video disks (DVDs). Not only signal detection functions but also control mechanisms such as focus servos or tracking servos are necessary for optical heads to read out a signal from an optical recording medium.

FIG. 24 illustrates a typical conventional optical head. As is shown in this drawing, a collimator lens 3 collimates a laser beam 2, which is emitted from a semiconductor laser 1 serving as the light source, into parallel light. After the laser beam 2 has passed through a focus/track error signal detection element 8, its optical axis is deflected 90° by a mirror 20 and the light enters an objective lens 4, which focuses the laser beam 2 on an optical disk 11. The laser beam is reflected and returns on the same light path. It is turned into parallel light by the objective lens 4, then reflected by the mirror 20, and enters the focus/track error signal detection element 8. When the laser beam 2 enters the focus/track error signal detection element 8, it is divided into two beams, which are focused on the photo-detectors 13a and 13b. Thus, regeneration signals and servo signals, i.e. focus error signals and track error signals, can be read.

As can be seen from FIG. 24, the height of the optical head can be expressed as the sum of the working distance (WD), the thickness of the objective lens 4, the space between a lower portion of the objective lens 4 and an upper portion of the mirror 20 (referred to as "lens-mirror space" in the following), and the height lz of the mirror 20.

When trying to devise a thinner optical head, the minimum total length of WD, lens thickness and the lens-mirror space are for the most part governed by the type of the optical disk 11. For example, for DVDs, the minimum values for WD, lens thickness and lens-mirror space can be estimated at 1.1 mm each, but the height lz of the mirror 20 has to be larger than a beam diameter $w_1$, for example 3 mm. Consequently, in this case, the minimum height of the optical head can be estimated at 6.3 mm, and it is difficult to devise a thinner head.

It is a purpose of the present invention to solve these problems of the prior art and to provide a thinner optical head.

SUMMARY OF THE INVENTION

To achieve this purpose, an optical head according to a first configuration of the present invention comprises a first grating element and a second grating element arranged in that order in a light path between a light source and an objective lens; and a light path alteration member arranged in a light path between the light source and the first grating element or in a light path between the second grating element and the objective lens. In such an optical head, the optical distance between the first grating element and the second grating element can be reduced, so that a lateral shift of the optical axis due to wavelength variations in the light source can be reduced. As a result, the lateral shift of the optical axis from the center of the objective lens can be reduced and a focussing spot with a favorable circular shape can be formed.

In the optical head according to the first configuration of the present invention, it is preferable that the light path alteration member is arranged in the light path between the light source and the first grating element; light emitted from the light source passes through the light path alteration member and then enters the first grating element; light diffracted by the first grating element enters the second grating element; and light diffracted by the second grating element enters the objective lens and is focused on a recording medium. In such a preferable example, light can be deflected toward the objective lens using the second grating element, so that a thinner optical head can be realized.

It is also preferable that the first grating element is a reflection element; the light path alteration member is a first transparent substrate having a first surface; the first grating element and the light path alteration member are arranged so that an angle defined by the optical axis of light emitted from the light source and a normal on the first surface is at least the critical angle, and an angle defined by the normal on the first surface and the optical axis of light diffracted by said first grating element to the second grating element is smaller than the critical angle; light emitted from the light source is reflected from the first surface and enters the first grating element; and light reflected and diffracted by the first grating element passes the first surface and enters the second grating element. In such a preferable example, the optical axis of the light emitted from the light source can be shifted toward the recording medium, so that a thinner optical head can be achieved. In this case, it is even more preferable that the first transparent substrate is a triangular prism having a slanted face, a bottom face and a side face; the slanted face is the first surface; the first grating element is provided on the bottom face; and light emitted from the light source enters the first transparent substrate through the side face. In this specification, a "slanted surface" means a surface that is not substantially perpendicular or parallel with respect to the direction of the light beam. Moreover, in this case, it is preferable that the second grating element is a transmission element; the optical head further comprises a second transparent substrate, on an upper face of which the second grating element is formed; a multi-layered film is formed on the first surface of the first transparent substrate; and the first transparent substrate and the second transparent substrate are integrated into one component by the multi-layered film. It is also preferable that the second grating element is a transmission element; the optical head further comprises a second transparent substrate, on an upper face of which the second grating element is formed; and an air gap is provided between the first transparent substrate and the second transparent substrate. It is also preferable that the second grating element is a transmission element; the optical head further comprises a second transparent substrate on an upper face of which the second grating element is formed; and the second transparent substrate is a triangular prism. It is also preferable that the second grating element is a reflection element; the optical head further comprises a second transparent substrate on a lower face of which the second grating element is formed; a multi-layered film is formed on the first surface of the first transparent substrate; the first transparent substrate and the second transparent substrate are integrated into one component by the multi-layered film; and the first grating element and the second grating element are arranged on the same plane. In these preferable examples, the first grating element and the second grating element can be easily manufactured.

It is preferable that a first incidence angle defined by the optical axis of a laser beam travelling from the light path alteration member to the first grating element and the normal on the first grating element is larger than an outgoing angle defined by the optical axis of diffracted light from the first grating element and the normal on the first grating element, and a second incidence angle defined by the optical axis of the laser beam from the first grating element entering the second grating element and the normal on the second grating element is larger than an outgoing angle defined by the normal on the second grating element and the optical axis of the light diffracted by the second grating element. In this preferable example, beam formation is performed and the light utilization efficiency can be raised. In this case it is even more preferable that the outgoing angles of light diffracted by the first grating element and the second grating element are substantially 0°. In this preferable example, beam formation can be performed with very high efficiency. It is also preferable that the optical head further comprises a first transparent substrate and a second transparent substrate, the second grating element being formed on the upper face or the lower face of the second transparent substrate; wherein the first transparent substrate and the second transparent substrate are integrated into one component by the first grating element. It is also preferable that the first incidence angle and the second incidence angle are 45° to 60°. In these preferable examples, effective beam formation can be performed and the light utilization efficiency can be raised.

In an optical head according to the first configuration of the present invention, it is preferable that an optical axis change of the light diffracted by the first grating element due to wavelength variation is at least partially cancelled out by an optical axis change of the beam diffracted by the second grating element. In this preferable example, an inclination of the optical axes due to wavelength variations caused by a change in the operation temperature of a semiconductor laser light source can be prevented.

Moreover, in an optical head according to the first configuration of the present invention, it is preferable that the first grating element and the second grating element are linear grating elements with the same uniform grating period. In this preferable example, the influence of wavelength variations can be completely eliminated.

Moreover, in an optical head according to the first configuration of the present invention, it is preferable that the first grating element and the second grating element are volume holograms having a periodic refractive index distribution. In this preferable example, a high diffraction efficiency of at least 90% can be realized even when the diffraction angle is large (for example, 45°). In this case, it is also preferable that the polarized light entering the volume holograms is S-polarized light on both the outgoing light path and the return light path. In this preferable example, the volume holograms can be easily manufactured, and the light utilization efficiency can be raised. Moreover, in this case, it is preferable that the optical head further comprises a polarizing focus/track error signal detection element, wherein the amplitude of spatial modulation of the refractive index in the volume holograms is adjusted so that the product of a first-order diffraction efficiency of S-polarized light and a first-order diffraction efficiency of P-polarized light is maximized. In this preferable example, the total light utilization efficiency can be raised.

Moreover, in an optical head according to the first configuration of the present invention, it is preferable that the optical head further comprises a polarizing focus/track error signal detection element; and a ¼ wavelength plate arranged in a light path between the second grating element and the objective lens. In this preferable example, the light beam passes the polarizing focus/track error signal detection element on the outgoing light path almost without loss, because the S-polarized light is provided as light coming from the light source. Because the beam passes the ¼ wavelength plate on the outgoing and the return way, the light entering the focus/track error signal detection element is P-polarized light on the return way, so that it can be effectively diffractive toward the photo-detectors.

Moreover, it is preferable that the diffraction angles of the first grating element and the second grating element are at least 45°. In this preferable example, the optical head can be made extremely thin.

Moreover, in an optical head according to the first configuration of the present invention, it is preferable that the first grating element and the second grating element are provided on the same transparent substrate. It is also preferable that the first grating element and the second grating element are provided on the same plane on the same transparent substrate. It is also preferable that the first grating element and the second grating element are provided on the same surface of the transparent substrate. It is also preferable that a triangular prism is arranged on the transparent substrate so that its lower face opposes the first grating element, and a slanted face of the triangular prism is the light path alteration member. It is also preferable that a reflection plate is arranged on a back face side of the transparent substrate, separated therefrom by an air layer; and light diffracted from the transparent substrate into the air layer is reflected from the reflection plate and enters the second grating element. In this preferable example, the light passing the first grating element and entering the transparent substrate is refracted at the border between the transparent substrate and the air layer, reflected from the reflection plate, and enters the second grating element, so that the sum of the thicknesses of the transparent substrate, the air layer, and the reflection plate can be reduced. As a result, a thinner optical head can be achieved.

Moreover, in an optical head according to the first configuration of the present invention, it is preferable that the second grating element converts parallel light into divergent light and divergent light into parallel light. In this preferable example, a two-wavelength configuration using one collimator lens and one objective lens can focus light of wavelengths corresponding to optical disks with a relatively thick protective layer such as CDs and optical disks with a relatively thin protective layer such as DVDs favorably and without aberration on the pit surfaces of the disks.

Moreover, in an optical head according to the first configuration of the present invention, it is preferable that the first grating element and the second grating element comprise multi-layered volume holograms, each layer corresponding to a different wavelength. In this preferable example, several kinds of disks can be used with corresponding different wavelengths.

Moreover, in this case, it is preferable that the thickness of each layer in the multi-layered volume hologram corresponds to a different wavelength. In this preferable example, the tolerances for the diffraction efficiencies of the different wavelengths can be set to an optimum for each kind of disk.

In this case, it is even more preferable that the thickness of each layer in the multi-layered volume hologram is substantially proportional to different a wavelength.

It is also preferable that each layer in the multi-layered volume hologram has fringes with periodic refractive index distributions and different inclination angles. In this preferable example, the generation of unnecessary diffractive light in a layer that does not correspond to that wavelength can be reduced and the light utilization efficiency increased.

It is also preferable that the multi-layered volume holograms have fringes with periodic refractive index distributions and identical inclination angles. In this preferable example, the inclinations of the optical axes at the wavelengths of the diffracted light travelling from the first grating element to the second grating element can be equalized.

Moreover, it is also preferable that the first grating element and the second grating element comprise two-layered volume holograms, each of the two layers corresponding to one of the two wavelengths $\lambda_1$ and $\lambda_2$ characterized by $0.60$ $\mu m \leq \lambda_1 \leq 0.68$ $\mu m$ and $0.76$ $\mu m \leq \mu_2 \leq 0.87$ $\mu m$. In this preferable embodiment, the unnecessary diffraction of light of other wavelengths at the two-layered first grating element and the two-layered second grating element can be reduced, and, for example, DVDs, CD-Rs, and CDs can be favorably read.

It is also preferable that the first grating element and the second grating element comprise three-layered volume holograms, each of the three layers corresponding to one of the three wavelengths $\lambda_1$, $\lambda_2$ and $\lambda_3$ characterized by $0.38$ $\mu m \leq \lambda_1 \leq 0.52$ $\mu m$, $0.60$ $\mu m \leq \lambda_2 \leq 0.68$ $\mu m$ and $0.76$ $\mu m \leq \lambda_3 \leq 0.87$ m. In this preferable embodiment, the unnecessary diffraction of light of other wavelengths at the three-layered first grating element and the three-layered second grating element can be reduced, and, for example, many optical disks such as high-density disks with more than 10 GByte capacity, DVDs, CD-Rs, and CDs can be favorably read.

An optical head according to a second configuration of the present invention comprises a light source emitting a light beam in a first direction; first deflector for deflecting the light beam from the first direction into a second direction; second deflector for deflecting the light beam deflected by the first deflector into a third direction; and an objective lens for focusing the light beam deflected by the second deflector onto an optical recording medium; wherein the third direction is substantially perpendicular to the recording surface of the optical recording medium, and the length of the second deflector in the third direction is smaller than the width in the third direction of the light beam travelling in the first direction. According to this second configuration of the optical head, a light beam emitted from the light source can be deflected in a diagonal direction (the second direction) by the first deflector, so that the incidence angle into the second deflector can be tilted with respect to the y-axis direction. As a result, the height of the second deflector, which conflicts with the objective lens, can be reduced, so that a thinner optical head can be achieved.

In this second configuration of the optical head, it is also preferable that the first deflector is a triangular prism.

In this second configuration of the optical head, it is also preferable that the second deflector is a reflection grating element.

In this second configuration of the optical head, it is also preferable that the second deflector is a mirror.

DESCRIPTION OF THE PREFERRED EMBODIMENTS

First Embodiment

Figure 1:
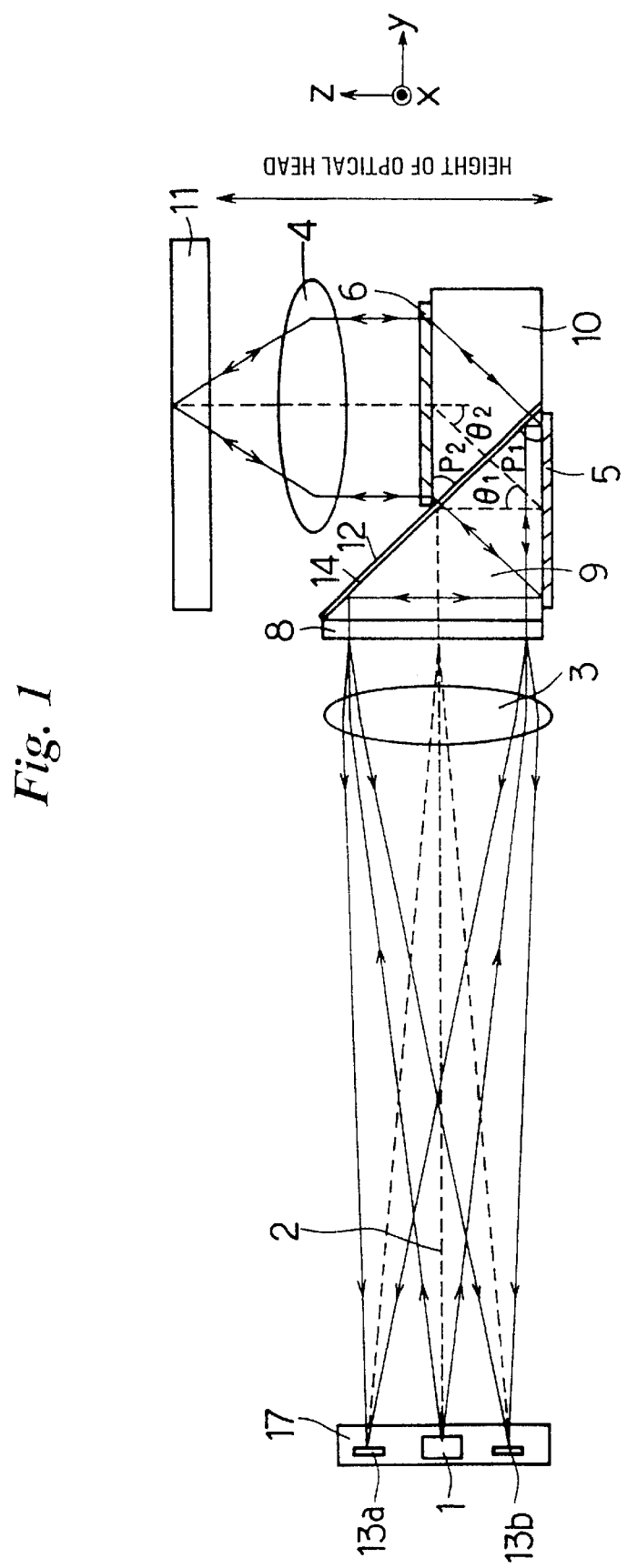
FIG. 1 is a side elevation of the basic structure of an optical head according to a first embodiment of the present invention and its light transmission paths.

An optical head according to a first embodiment of the present invention is explained in detail with reference to FIGS. 1 to 4, with the coordinate axes as indicated in the drawings.

Figure 2A:
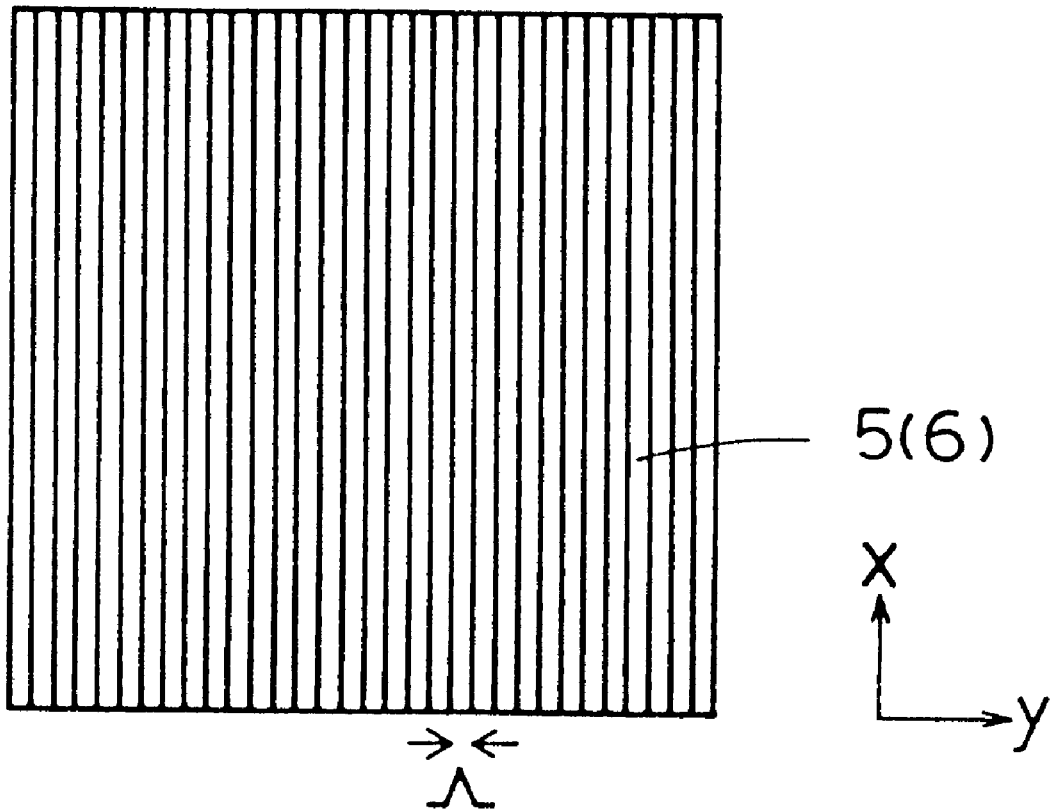
FIG. 2(a) is a plan view of a first or a second grating element in the first embodiment of the present invention.
Figure 2B:
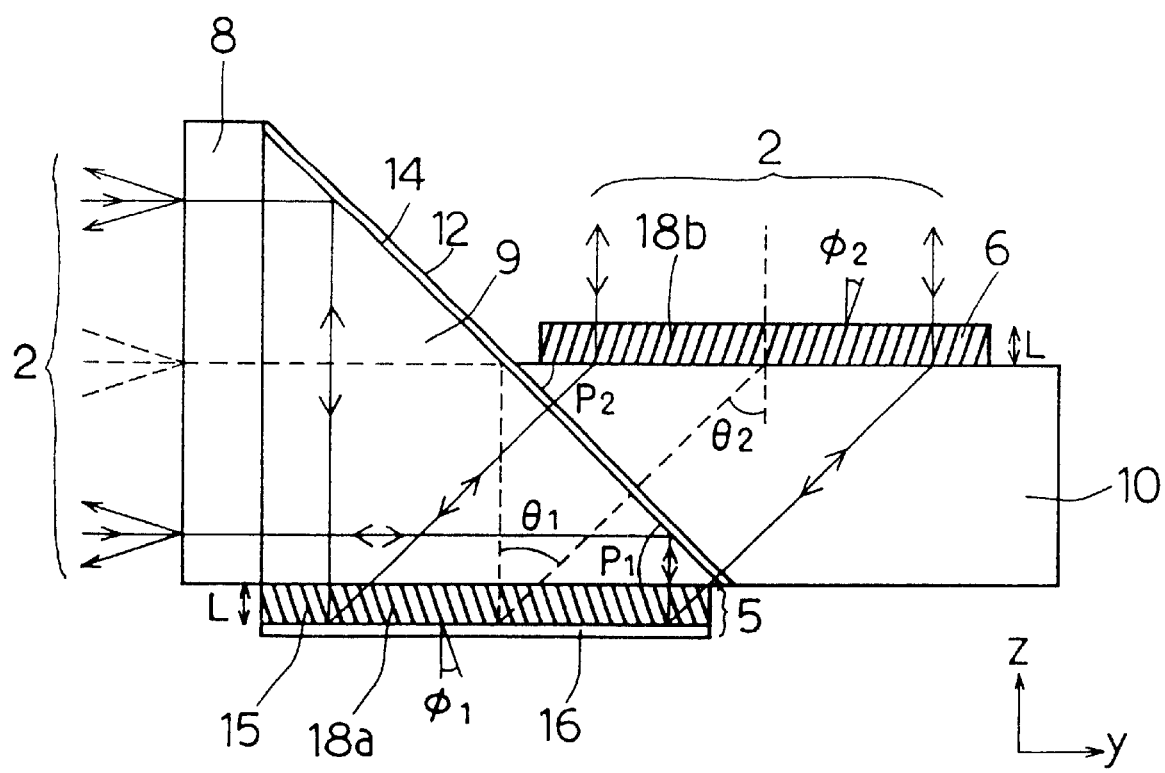
FIG. 2(b) is a elevation detailing a central portion of the optical head according to the first embodiment of the present invention and the first and the second grating element in this central portion.
Figure 3A:
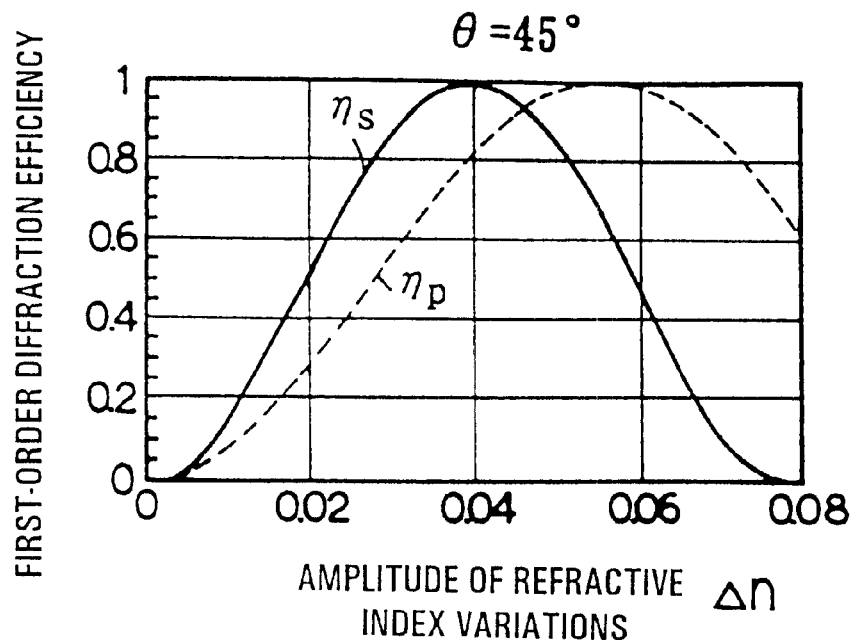
FIG. 3(a)–(c) are graphs showing the first-order diffraction efficiency of the first and the second grating elements in the optical head according to the first embodiment as a function of the amplitude $\Delta n$ of the spatial modulation of the refractive index.
Figure 3B:
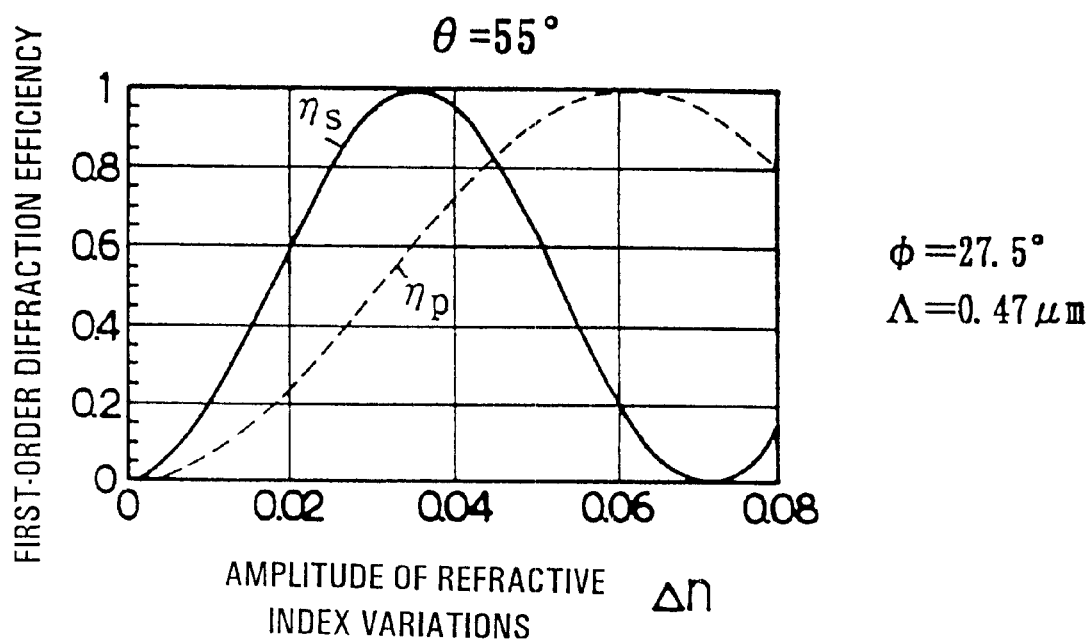
Figure 3C:
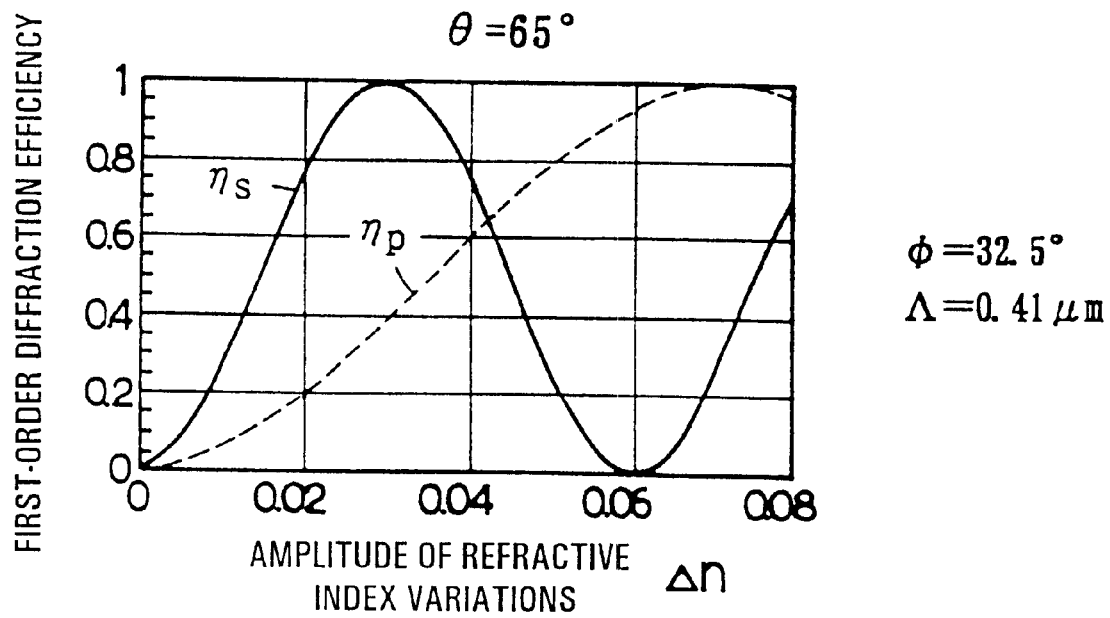
Figure 4:
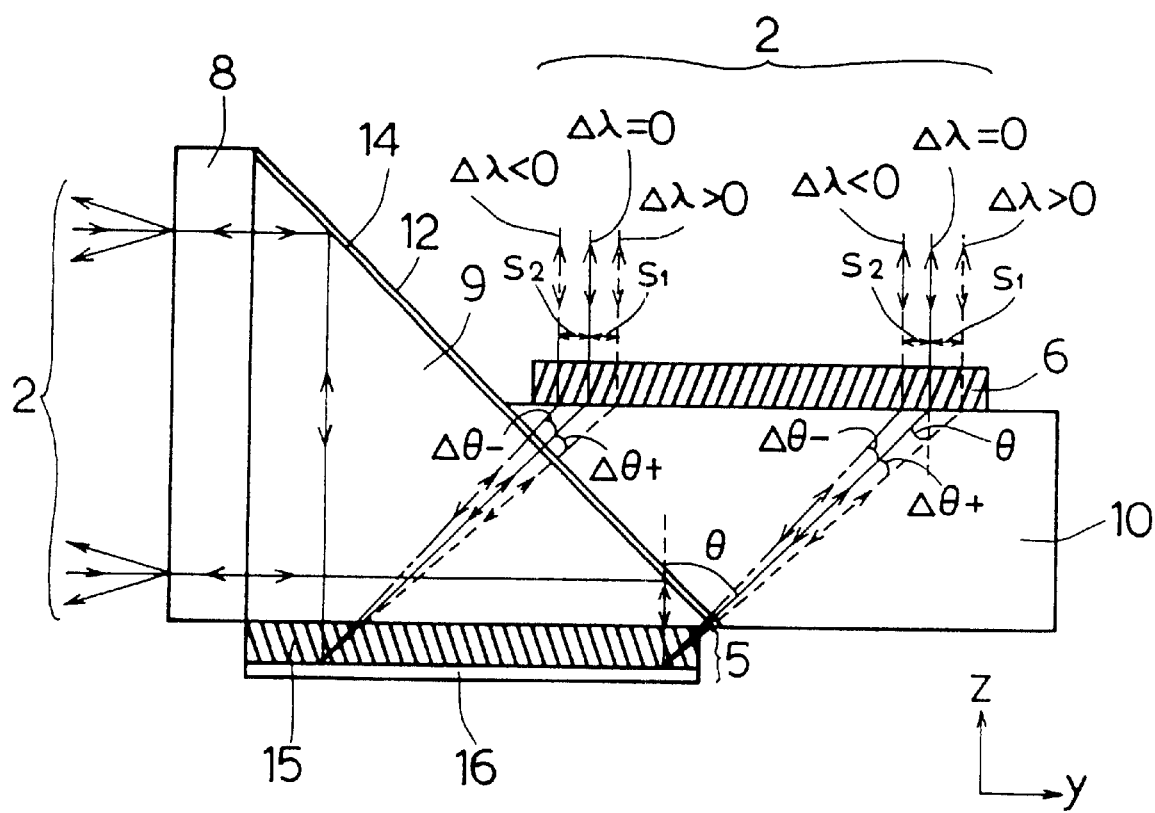
FIG. 4 is a side elevation describing the behavior of the light beams diffracted by the first and the second grating elements when there are wavelength differences in the incident light of the optical head according to this embodiment.

FIG. 1 is a side elevation of the basic structure of an optical head according to the first embodiment of the present invention and its light transmission paths. FIG. 2(a) is a plan view of a first or a second grating element, and FIG. 2(b) is a side elevation detailing a central portion of the optical head according to a first embodiment of the present invention and the first and the second grating elements in this central portion. FIG. 3 is a graph showing the first-order diffraction efficiency of the first and the second grating elements in the optical head according to this embodiment as a function of the amplitude $\Delta n$ of the spatial modulation of the refractive index. FIG. 4 is a side elevation showing the light paths of the beams diffracted by the first and the second grating elements when there are wavelength variations in the incident light in the optical head according to this embodiment.

As is shown in FIG. 1, the optical head of this embodiment includes a light path alteration member 14, a first grating element 5, and a second grating element 6 are arranged in the light path between a light source 1 and an optical disc 11, which can be a recording medium such as a DVD or a CD. The light source 1 and photo-detectors 13a and 13b are integrated into a light-source/photo-detector unit 17.

A collimator lens 3 collimates the, for example, S-polarized laser beam 2 (direction of the electric field is parallel to the direction of the x-axis), which has a wavelength of, for example, $\lambda=0.655$ $\mu$m, emitted by the semiconductor laser light source 1 in the direction of the y-axis into a beam of parallel light with, for example, 2.8 mm beam diameter. This beam passes through a focus/track error signal detection element 8 (utilizing zero-order diffraction light), and enters a light path alteration member 14. The laser beam 2 is completely reflected into the negative z-direction by this light path alteration member 14, and enters a first grating element 5. Then, the first-order diffraction light, is reflected and diffracted at an angle of, for example, $\theta_1=45°$, passes through the light path alteration member 14, and enters a second grating element 6. Then, an objective lens 4 focuses the first-order diffraction light, diffracted at an angle of, for example, $\theta_2=45°$, on an optical disk 11.

The laser beam 2 is reflected by the optical disk 11 and returns in the opposite direction, through the objective lens 4, the second grating element 6, the first grating element 5, the light path alteration member 14, and then in the negative y-axis direction through the focus/track error signal detection element 8, which divides the beam (utilizing first-order diffraction light). Finally the beams are detected by the photo-detectors 13a and 13b.

In this embodiment, a triangular prism (made of, for example, glass or a resin) can be used for a first transparent substrate 9. The triangular prism has, for example, a height of 3.2 mm and an angle of $P_1=45°$ between a slant face (first surface) and a bottom face. The first grating element 5 is formed on the bottom face of the first transparent substrate 9. The slant face (first surface) is used as the light path alteration member 14. The second grating element 6 is formed on a surface of a second transparent substrate 10 (made of, for example, glass or a resin) having a cross-section of an upside-down trapezoid. The second transparent substrate 10 has a thickness (height) of, for example, 1.7 mm and the trapezoid has a slant face with an angle of $P_2=45°$. The slant faces of the first transparent substrate 9 and the second transparent substrate 10 are attached via a multi-layered film 12, so that the two transparent substrates are integrated into one piece. Moreover, in this embodiment, the bottom faces of the first transparent substrate 9 and the second transparent substrate 10 are on the same plane.

The focus/track error signal detection element 8 includes, for example, a resin substrate or a glass substrate on whose surface a hologram element is formed. The focus/track error signal detection element 8 is integrated on a side face of the first transparent substrate 9.

The angle between the optical axis of the laser beam 2 emitted by the light source 1 and the normal on the slant face 14 (of the light path alteration member) on the first transparent substrate 9 is adjusted to be more than the critical angle (which is for example 41.8° when the refractive index of the first transparent substrate 9 is 1.5), for example 45°. The angle between the normal on the slant face 14 (of the light path alteration member) on the first transparent substrate 9 and the optical axis of the light diffracted by the first grating element 5 to the second grating element 6 is adjusted to be less than the critical angle, for example 0°. Thus, the optical axis of the laser beam 2 emitted from the light source 1, which is indicated by a broken line, can be shifted into the z-direction, that is the direction of the optical disk 11 (in FIG. 1, the optical axis of the laser beam 2 emitted from the light source 1 is substantially matched with the surface of the transparent substrate 10). As a result, an optical head with a total height of, for example, 5.0 mm can be realized, which is considerably thinner than a conventional optical head (which has a total height of 6.3 mm). Especially, by setting the diffraction angles $\theta_1$ and $\theta_2$ above 45°, a super-thin optical head of less than 5 mm total height can be obtained.

In embodiments of the present invention, linear gratings with a uniform period of, for example, $\Lambda=0.57$ $\mu$m are used for the first and the second grating elements 5 and 6, as shown in FIG. 2(a). In particular, a reflection volume hologram is used for the first grating element 5 and a transmission volume hologram is used for the second grating element 6.

As is shown in FIG. 2(b), these volume holograms are formed as a periodic structure with a sinusoidal refractive index distribution using, for example, the material of photopolymers. Such structures can be formed by two-beam interference using an argon laser beam (with wavelengths of, for example, $\lambda=0.5145$ $\mu$m and 0.488 $\mu$m). This interference method is well known in the art. Using volume holograms for the first and the second grating elements 5 and 6, a large diffraction efficiency of at least 90% can be realized even for a large diffraction angle of, for example, 45°. The material for the volume holograms is not necessarily limited to light-sensitive resins such as photo-polymers, but can be also a material such as gelatin or a photo-refractive material such as $LiNbO_3$ doped with Fe or $BiTiO_3$.

The first grating element 5 comprises a refractive index distribution layer 15 with a thickness of L=7 $\mu$m, and a reflective film 16 of, for example, Al or Au deposited on a surface thereof Fringes 18a for the periodical structure of the refractive index distribution (with an amplitude $\Delta n$ of the spatial modulation of the refractive index of, for example, 0.04) are inclined in the negative y-axis direction (this inclination angle $\phi_1$ is half of the diffraction angle, i.e. for example, 22.5°). Thus, when the laser beam 2 enters the first grating element 5 at a right angle, its first-order diffraction light leaves the first grating element 5 at a tilt angle of 45° ($\theta_1$=45°) due to Bragg diffraction, so the diffraction angle of the first grating element 5 is 45°. When the diffraction angle is larger than the critical angle, as in this case, the reflective film 16 can be omitted. The refractive index distribution layer 15 of the second grating element 6 has the same period and thickness as the first grating element 5. However, it has no reflective film deposited thereon, and its fringes 18b of the refractive index distribution are tilted in the positive y-axis direction (this inclination angle is, for example, $\phi_2$=22.5°).

By orienting the inclination angles of the fringes of the first grating element 5 and the second element 6 in different directions, the light beam emitted in the y-axis direction from the light source 1 can be deviated efficiently toward the z-axis direction. Moreover, when using a semiconductor laser beam, the wavelength of the emitted light can change about ±10 nm due to changes in the operational temperature. However, in this embodiment, the optical axis change of the beam diffracted by the first grating element 5 due to the wavelength variation is at least partially cancelled out by the optical axis change of the beam diffracted by the second grating element 6. As a result, a perpendicular incident beam can be attained regardless of the emitted wavelength, and the influence of wavelength variations from the light source 1 can be at least partially canceled out.

FIG. 4 describes the behavior of the light beam in the case of wavelength variations in particular.

When there are no wavelength variations ($\Delta\lambda$=0) in the laser beam 2 emitted in the y-axis direction from the light source 1, the laser beam 2 is diffracted by the first and the second grating elements 5 and 6 (every diffraction angle is taken to be $\theta$), as indicated by the solid lines in FIG. 4, and emitted (perpendicularly) in the z-axis direction. When variations occur towards longer wavelengths ($\Delta\lambda$>0), the diffraction angle at the first grating element 5 increases by $\Delta\theta$+, as indicated by the broken line, but the entrance angle into the second grating element 6 increases also by $\Delta\theta$+, so that the diffracted light leaves the second grating element 6 (perpendicularly) in the z-axis direction, and no inclination of the light axis due to wavelength variations occurs. On the other hand, when wavelength variations occur toward shorter wavelengths ($\Delta\theta$<0), the diffraction angle at the first grating element 5 decreases by $\Delta\theta$-, as indicated by the double-dashed line, but the entrance angle into the second grating element 6 decreases also by $\Delta\theta$-, so that the diffracted light leaves the second grating element 6 (perpendicularly) in the z-axis direction, and no inclination of the light axis due to wavelength variations occurs. Especially, when the periods of the first and the second grating elements 5 and 6 are exactly matched, the influence of wavelength variations can be completely eradicated, but even when there are small differences in the periods, a tendency to cancel out can be observed.

Because the first grating element 5 and the second grating element 6 are arranged in this order on the light path from the light source 1 to the objective lens 4, the optical distance between the first grating element 5 and the second grating element 6 can be made smaller Accordingly, the lateral shifts $s_1$ and $s_2$ of the optical axis due to wavelength variations from the light source 1 can be kept small. Consequently, the lateral shift from the center of the objective lens 4 can be decreased, so that a favorable circular focussing spot can be formed.

In this embodiment, volume holograms having a periodical structure with a sinusoidal refractive index distribution were used for the first and the second grating elements 5 and 6. However, as is shown in FIG. 3, the first-order diffraction efficiency depends on the amplitude $\Delta n$ of the spatial modulation of the refractive index, and its behavior changes according to the polarization direction of the incident light. FIGS. 3(a), (b) and (c) show the first-order diffraction efficiency for diffraction angles $\theta$ of 45°, 55° and 65°. The solid lines are for S-polarized light and the broken lines are for P-polarized light (direction of the electric field is parallel to the y-z plane). These diagrams are for a wavelength $\lambda$=0.655 $\mu$m, a thickness L=7 $\mu$m, an average refractive index n=1.5 of the volume holograms, and a fringe inclination angle $\phi$=$\theta$/2.

As can be seen from FIG. 3, when the diffraction angle $\theta$ becomes large, a 100% first-order diffraction efficiency for small amplitudes $\Delta n$ of the refraction index change can be realized better when S-polarized light is used as incident light (and for large amplitudes $\Delta n$ using P-polarized light). In general, the larger the diffraction angle $\theta$, the thinner the optical head that can be achieved. Moreover, when S-polarized light is used, the amplitude $\Delta n$ of the spatial modulation of the refractive index where the first-order diffraction efficiency is 100% becomes smaller with growing diffraction angle $\theta$ (and larger in the case of P-polarized light). The production of volume holograms is easier for small amplitudes $\Delta n$ of the spatial modulation of the refractive index. Therefore, by using S-polarized light for both outgoing and return light paths, the production of the volume holograms in the optical head according to the present invention becomes easy, and the light utilization efficiency is increased. However, an operation with P-polarized light is also possible.

In this embodiment, volume holograms with a refractive index distribution were cited as examples for the first and the second grating elements 5 and 6. However, an operation is also possible with surface-relief gratings. In that case, however, it may be difficult to attain both, large diffraction angles and high diffraction efficiency.

Figure 5:
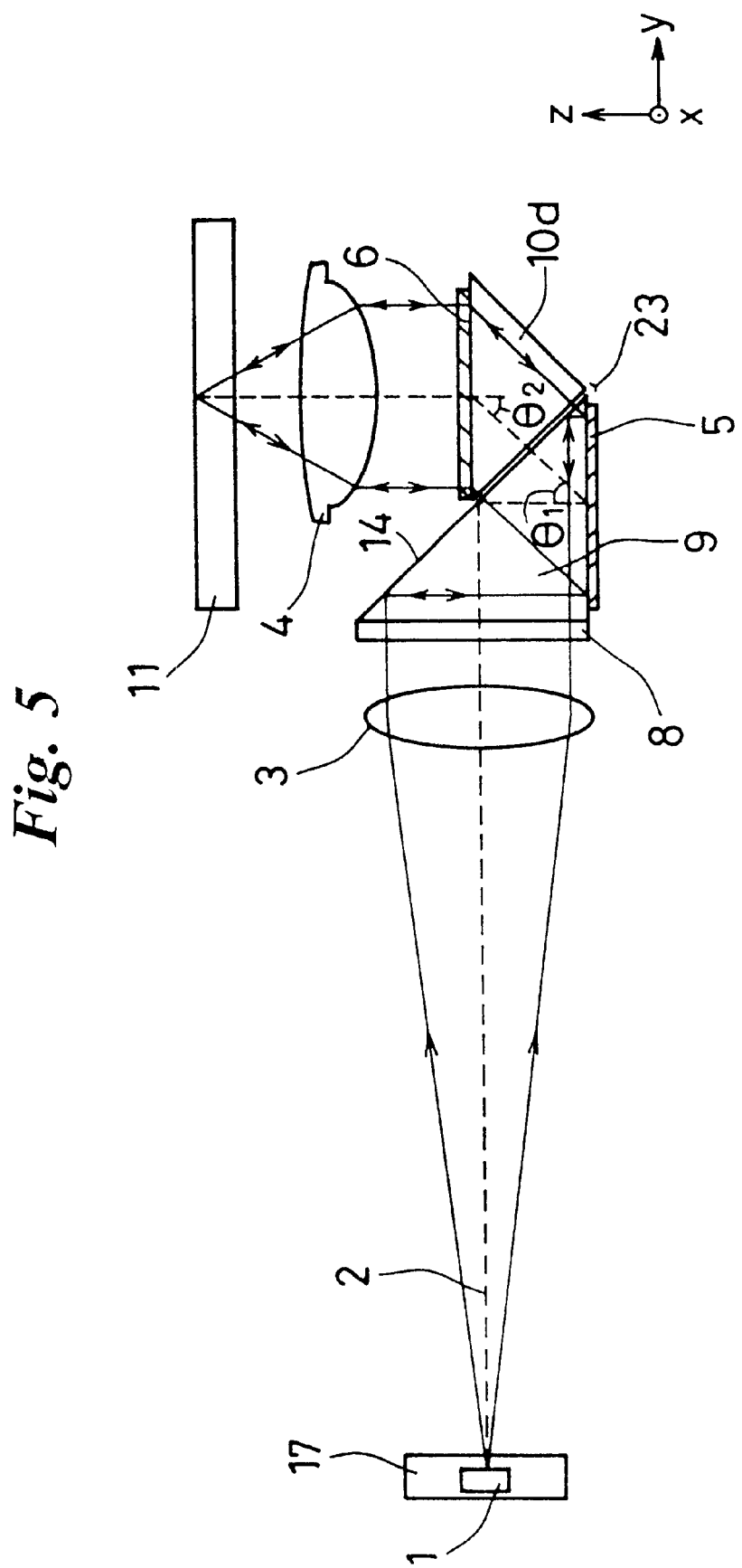
FIG. 5 is a side elevation of the basic structure of another optical head according to the first embodiment of the present invention and its light transmission paths.

Furthermore, in this embodiment, the first transparent substrate 9 and the second transparent substrate 10 were attached and integrated by a multi-layered film 12. However, the present invention is not limited to such a structure. A structure is also possible, where there is only an air gap 23 between the first transparent substrate 9 and a second transparent substrate 10d, as illustrated in FIG. 5, although the structure including a multi-layered film 12 between the first transparent substrate 9 and the second transparent substrate 10, as shown in FIG. 1, is more stable and thus more preferable.

Furthermore, in this embodiment, a transparent substrate 10 whose cross-section has a trapezoidal shape is used for the second transparent substrate. However, the present invention is not limited to such a structure. The second transparent substrate should have a form that can ensure the light path of the laser beam 2, and a surface with the second grating element 6 on the side of the objective lens 4. It can also be a triangular prism, as shown in FIG. 5, just as the first transparent substrate 9.

Figure 6:
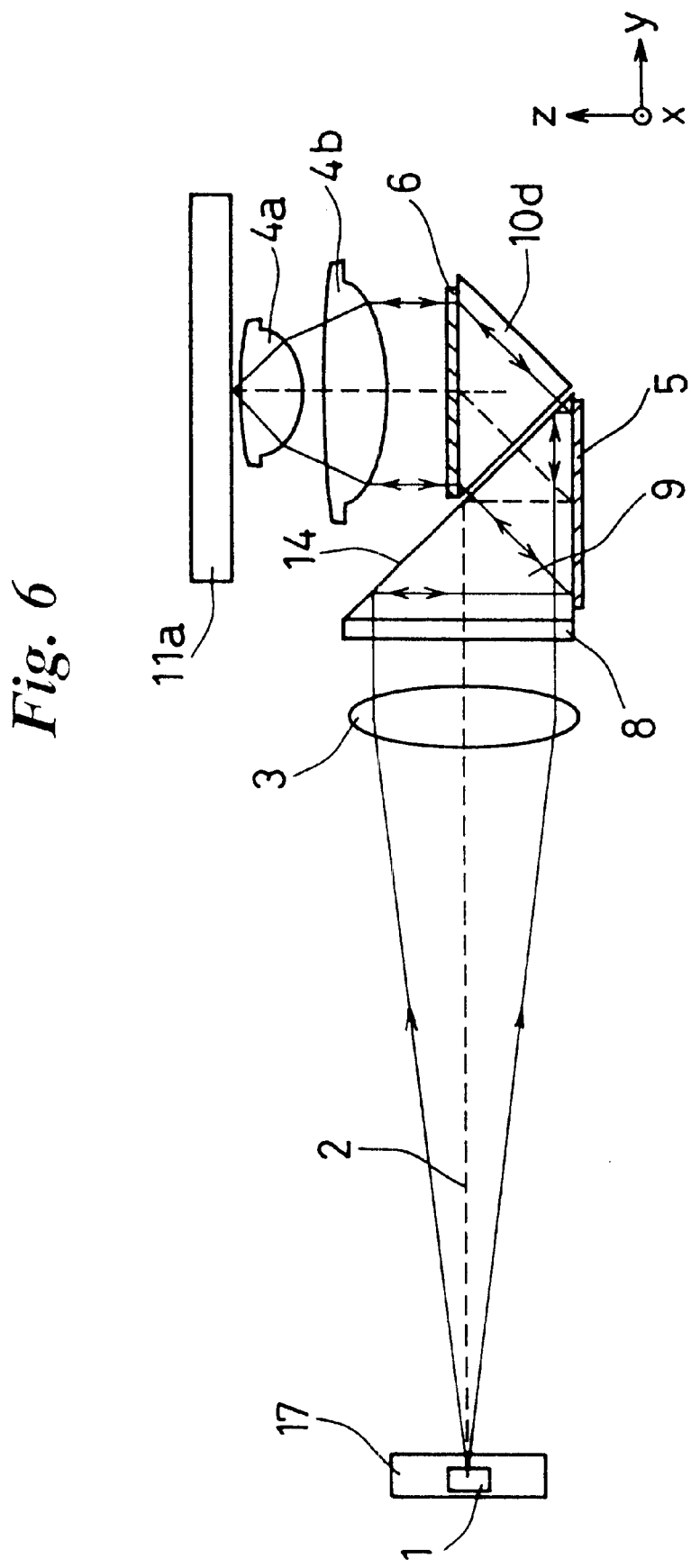
FIG. 6 is abide elevation of the basic structure of yet another optical head according to the first embodiment of the present invention and its light transmission paths.

According to this embodiment, the optical axis of the laser beam 2 emitted from the light source 1 can be shifted in the direction of the z-axis, i.e. the direction of the optical disk 11. Accordingly, it is possible to arrange a plurality of objective lenses 4a and 4b with a high NA of, for example, 0.7 to 0.9 between the second grating element 6 and the optical disk 11a, as shown in FIG. 6. As a result, the optical head can be made thinner and the optical disc 11a can hold a higher density.

Second Embodiment

The differences between an optical head according to a second embodiment of the present invention and one according to the first embodiment of the present invention are explained in detail with reference to FIGS. 7 and 8.

Figure 7:
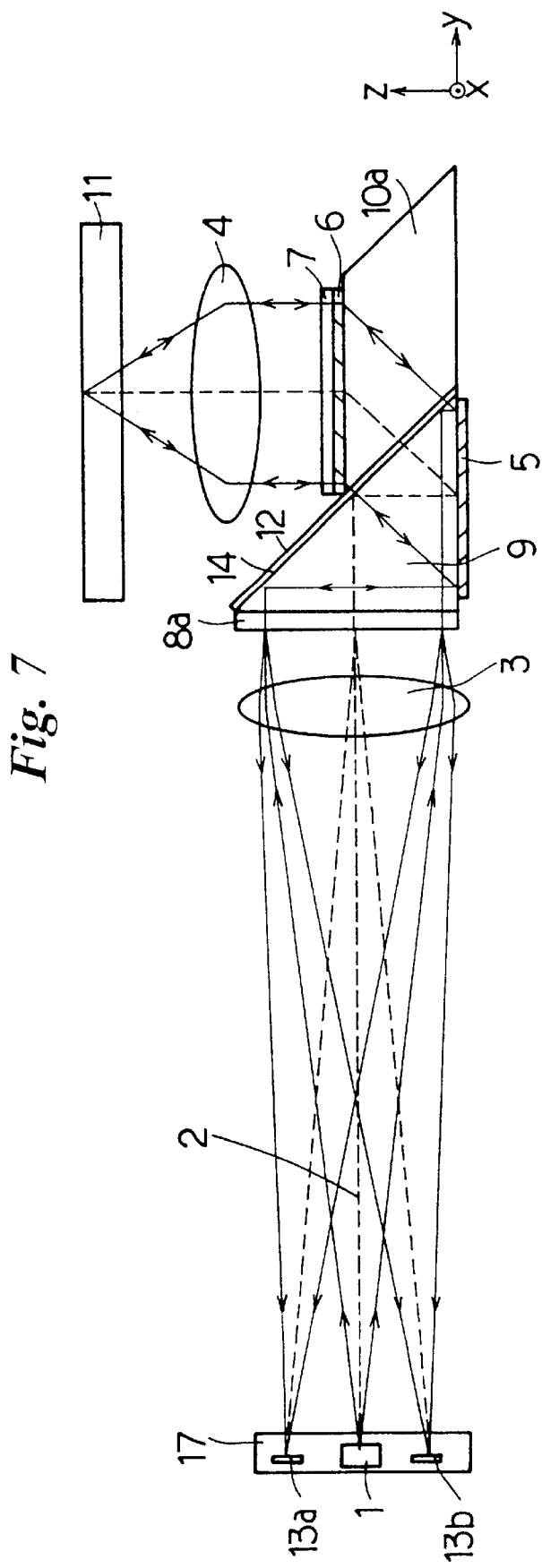
FIG. 7 is a side elevation of the basic structure of an optical head according to a second embodiment of the present invention and its light transmission paths.
Figure 8:
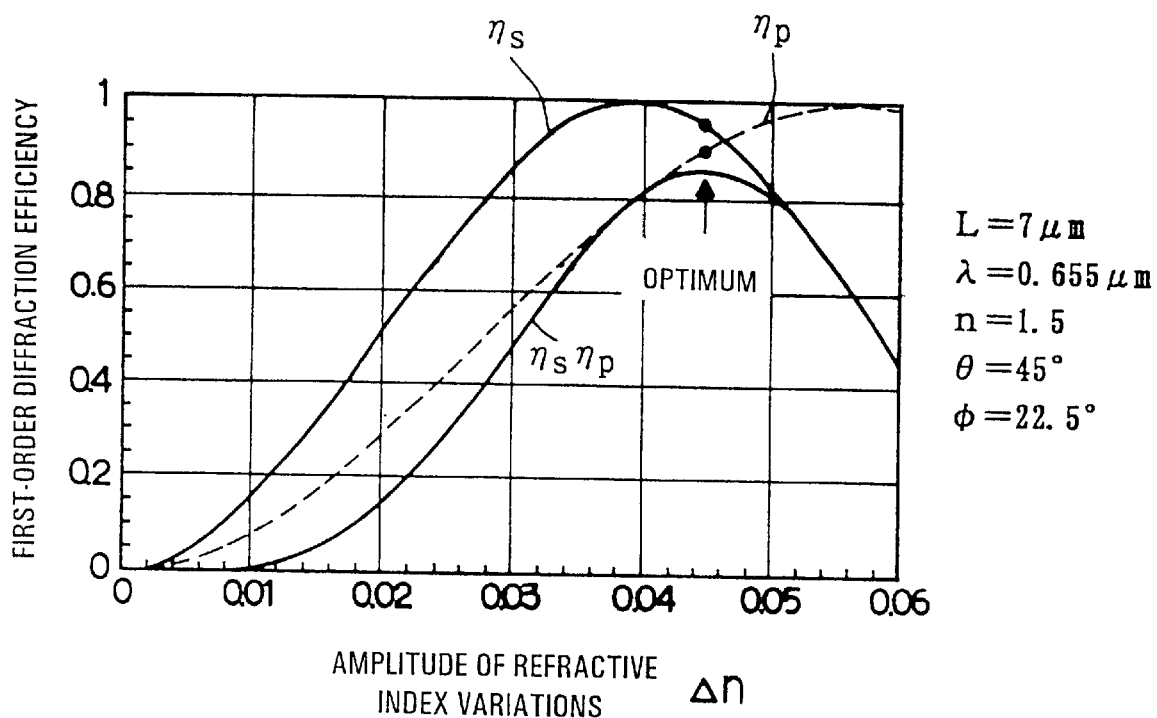
FIG. 8 is a graph showing the first-order diffraction efficiency of the first and the second grating elements in the optical head according to the second embodiment as a function of the amplitude $\Delta n$ of the spatial modulation of the refractive index.

FIG. 7 is a side elevation of the basic structure of an optical head according to the second embodiment of the present invention and its light transmission paths. FIG. 8 is a graph showing the first-order diffraction efficiency of the first and the second grating elements in the optical head according to this embodiment as a function of the amplitude Δn of the spatial modulation of the refractive index.

As shown in FIG. 7, the optical head in this embodiment comprises a polarizing focus/track error signal detection element 8a in the light path between the collimator lens 3 and the light path alteration member 14. Moreover, a ¼ wavelength plate 7 is provided in the light path between the second grating element 6 and the objective lens 4. The polarizing focus/track error signal detection element 8a can be, for example, a hologram element formed into a LiNbO₃ plate, and be a simple plate for S-polarized light and a hologram for P-polarized light. Therefore, the light utilization efficiency can be more than doubled compared to the optical head of the first embodiment, which comprises non-polarizing, substrates.

A second transparent substrate 10a has a right-hand face that is parallel to its left-hand face (and slanted at an angle of, for example, 45°). The cross-section of the entire second transparent substrate is a parallelogram. By providing the second transparent substrate 10a with such a shape, a large number of transparent substrates can be cut easily from a larger glass substrate, just by cutting in a diagonal direction, so that productivity can be raised and costs can be lowered.

As is shown in FIG. 7, the laser beam 2 emitted from the light source 1 is, for example, S-polarized light, which is transmitted on the outgoing light path almost without loss by the polarizing focus/track error signal detection element 8a. Then, the laser beam 2 passes and returns through the ¼ wavelength plate 7 formed on the second grating element 6, so that the returning laser beam 2 entering the focus/track error signal detection element 8 becomes P-polarized light, and is effectively diffracted onto the photo-detectors 13a and 13b. A birefringent material such as a quartz crystal can be used for the ¼ wavelength plate 7. However, a thinner optical head can be obtained if, for example, an obliquely deposited film such as a $Ta_2O_2$ film is used, because it can be formed with a thickness of only several μm.

In principle, the distribution of the focus/track error signal detection element 8a and the ¼ wavelength plate 7 can be in the optical order of: light source 1, focus/track error signal detection element 8a, ¼ wavelength plate 7, and optical disk 11, and it is preferable that the focus/track error signal detection element 8a is not arranged in the light path between the second grating element 6 and the objective lens 4, so that a thinner optical head can be achieved. Furthermore, if the ¼ wavelength plate 7 is arranged in the light path between the light source 1 and the first grating element 5, the light incident on the first and the second grating elements 5 and 6 is circularly polarized, and it becomes necessary to consider the influence of the phase shift of the polarization, which complicates especially the design of the first and the second grating elements 5 and 6. Consequently, the design can be facilitated by arranging the ¼ wavelength plate 7 in the light path between the second grating element 6 and the objective lens.

In this embodiment, S-polarized light enters the first and the second grating elements 5 and 6 on the outgoing path, and P-polarized light enters on the return path. By adjusting the amplitude Δn of the spatial modulation of the refractive index of the volume holograms to a value where the product $\eta_s \times \eta_p$ of the first-order diffraction efficiency $\eta_s$ for S-polarized light and the first-order diffraction efficiency $\eta_p$ for P-polarized light has a maximum, as indicated by the arrow in FIG. 8, the overall light utilization efficiency can be increased.

By adjusting the amplitude Δn of the spatial modulation of the refractive index of the volume holograms to a value where the product $\eta_s \times_p$ of the first-order diffraction efficiency $\eta_s$ for S-polarized light and the first-order diffraction efficiency $\eta_p$ for P-polarized light has a maximum, except the first-order diffraction light, there occurs a small amount of zero-order diffraction light that is transmitted or reflected without diffraction. First of all, zero-order diffraction light at the first grating element 5 on the outgoing path is reflected directly upwards in the z-axis direction, so that the angle with the light path alteration member 14 becomes larger than the critical angle. Consequently, it is reflected in the negative y-axis direction without being transmitted, and cannot reach the photo-detectors 13. Moreover, the zero-order diffraction light at the second grating element 6 on the outgoing path leaves to the right and cannot return, so that it has no influence. Zero-order diffraction light at the second grating element 6 on the return path leaves directly downward in the negative z-direction, so that it cannot pass the light path alteration member 14. And zero-order diffraction light at the first grating element 5 on the return path leaves to the left and cannot reach the photo-detectors 13.

This means that the light path alteration member 14 of this embodiment utilizes the critical angle and acts as a dam that cannot be passed by light other than the first-order diffraction light, so that a regeneration signal detection with favorable S/N ratio becomes possible.

Third Embodiment

An optical head according to a third embodiment of the present invention is explained with reference to FIG. 9, with emphasis on its differences versus one according to the first embodiment of the present invention.

Figure 9:
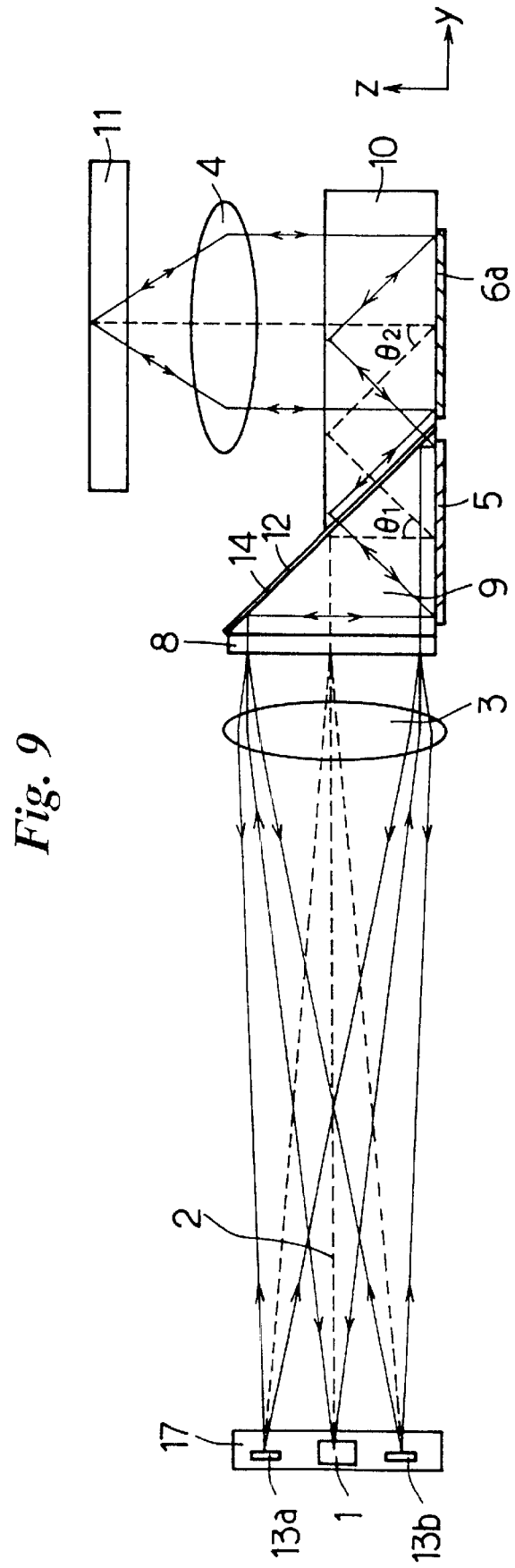
FIG. 9 is a side elevation of the basic structure of an optical head according to a third embodiment of the present invention and its light transmission paths.

FIG. 9 is a side elevation of the basic structure of an optical head according to the third embodiment of the present invention and its light transmission paths.

As is shown in FIG. 9, a second grating element 6a is a reflection element. This second grating element 6a is formed on the bottom face of the second transparent substrate 10. The laser beam 2, which has been diffracted at an angle $\theta_1$ from the first grating element 5, is totally reflected once at the upper surface of the second transparent substrate 10, and then enters the second grating element 6a. Due to this arrangement, the surface of the second transparent substrate 10 facing a lower portion of the objective lens 4 can be, for example, a simple glass face, which can be easily cleaned of dust or dirt. Even when the objective lens 4 touches the second transparent substrate 10, the damage to the second grating element 6a is small.

The back faces of the first and the second transparent substrates 9 and 10 are arranged on the same plane. Consequently, the first and the second grating elements 5 and 6a are also arranged on the same plane. Due to this arrangement, the production of the first and the second grating element 5 and 6a becomes very easy. Moreover, the first and the second grating elements 5 and 6a have almost the same structure as the first grating element shown in FIG. 2(b). That means, the first and the second grating elements 5 and 6a both have a reflective film formed on a surface of a refractive index distribution layer, so that due to their similar structure, they deform in the same manner when disturbed by, for example, temperature changes. A canceling effect arises from this symmetry, so that this structure is especially resistant against external influences. The fringe inclination of the first grating element 5 and the second grating element 6a is reversed with respect to their orientation towards the z-axis. The diffraction angle of the first grating element 5 is, for example, 45°. If this diffraction angle exceeds the critical angle, the reflective film 16 can be omitted.

By providing a reflection element as the second grating element 6a, the space between the first transparent substrate 9 and the objective lens 4 can be enlarged, so that an actuator for controlling the objective lens 4 (not shown in the drawing) can be fitted easily.

Figure 10:
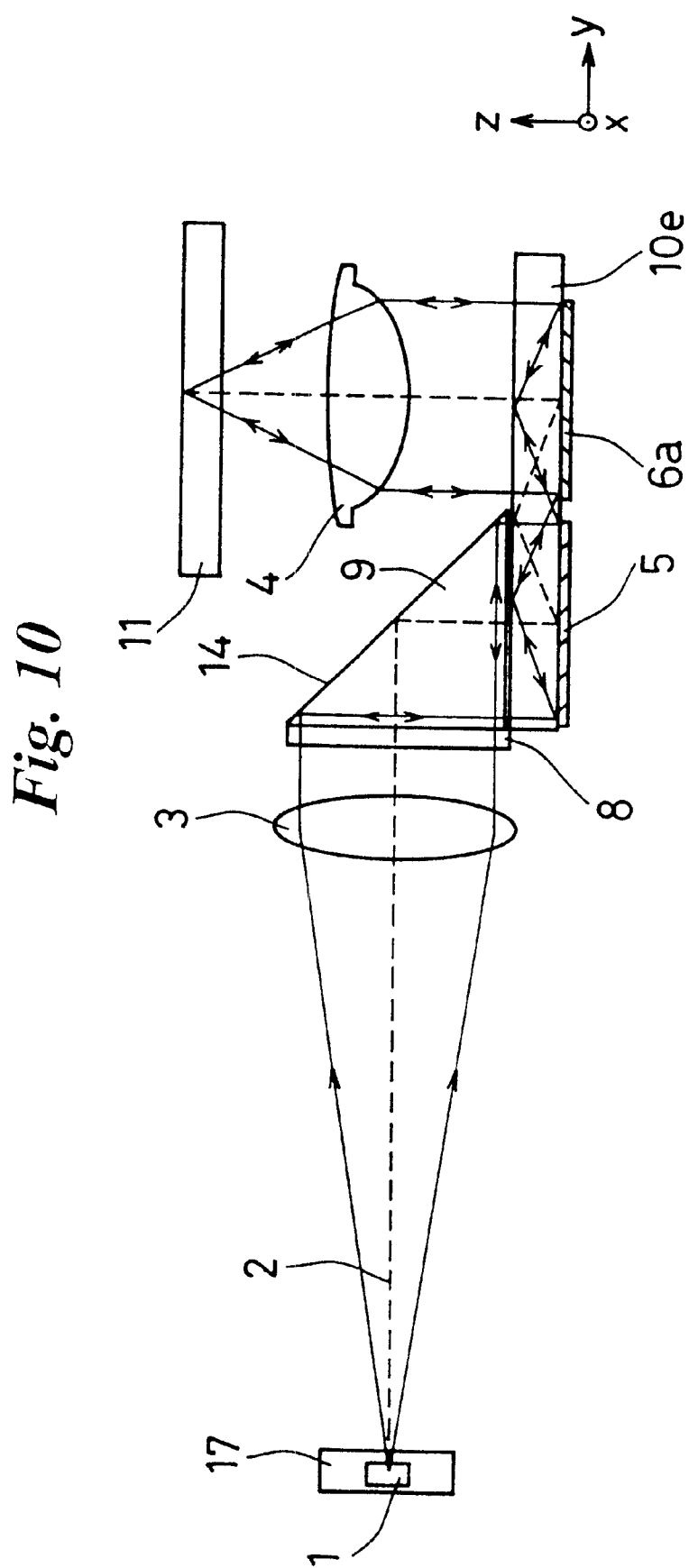
FIG. 10 is a side elevation of the basic structure of another optical head according to the third embodiment of the present invention and its light transmission paths.

In this embodiment, the slant faces of the first transparent substrate 9, which is a triangular prism, and the second transparent substrate 10, which has a trapezoidal cross-section, are attached in a manner that the back faces of the first and the second transparent substrates 9 and 10 are on the same plane. Thus, the first and the second grating elements 5 and 6a are arranged on the same plane (back face). However, the present invention is not limited to this, and the same effect can be attained by, for example, using a flat plate for the second transparent substrate 10e, as shown in FIG. 10, attaching substantially the left half of the upper face of this second transparent substrate 10e to the bottom face of the first transparent substrate 9 via an air gap, and arranging the first and the second grating elements 5 and 6a on the back side of the second transparent substrate 10e. Moreover, by providing the second transparent substrate 10e with such a shape, a large number of transparent substrates can be cut easily from a larger glass substrate, just by cutting in a perpendicular direction, so that productivity can be raised and costs can be lowered.

Fourth Embodiment

Next, an optical head according to a fourth embodiment of the present invention is explained with reference to FIGS. 11 and 12, with emphasis on its differences versus one according to the first embodiment of the present invention.

Figure 11A:
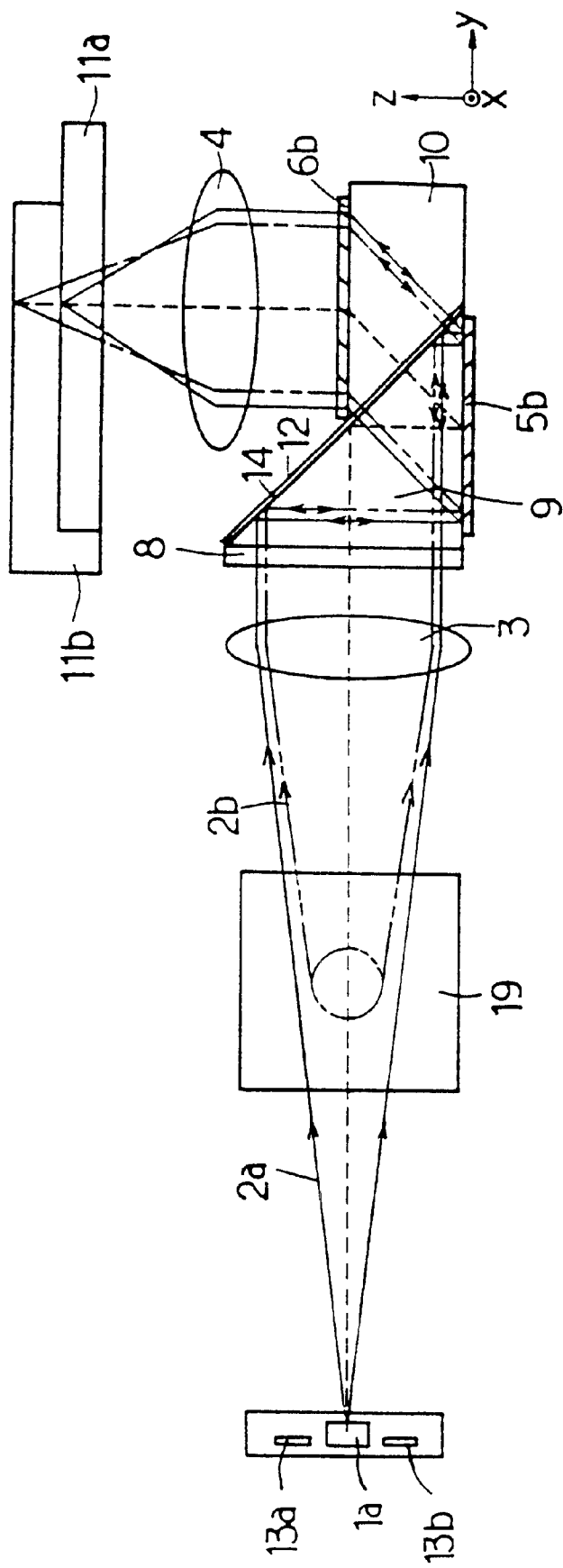
FIG. 11(a) is a side elevation of the basic structure of an optical head according toga fourth embodiment of the present invention and its light transmission paths.
Figure 11B:
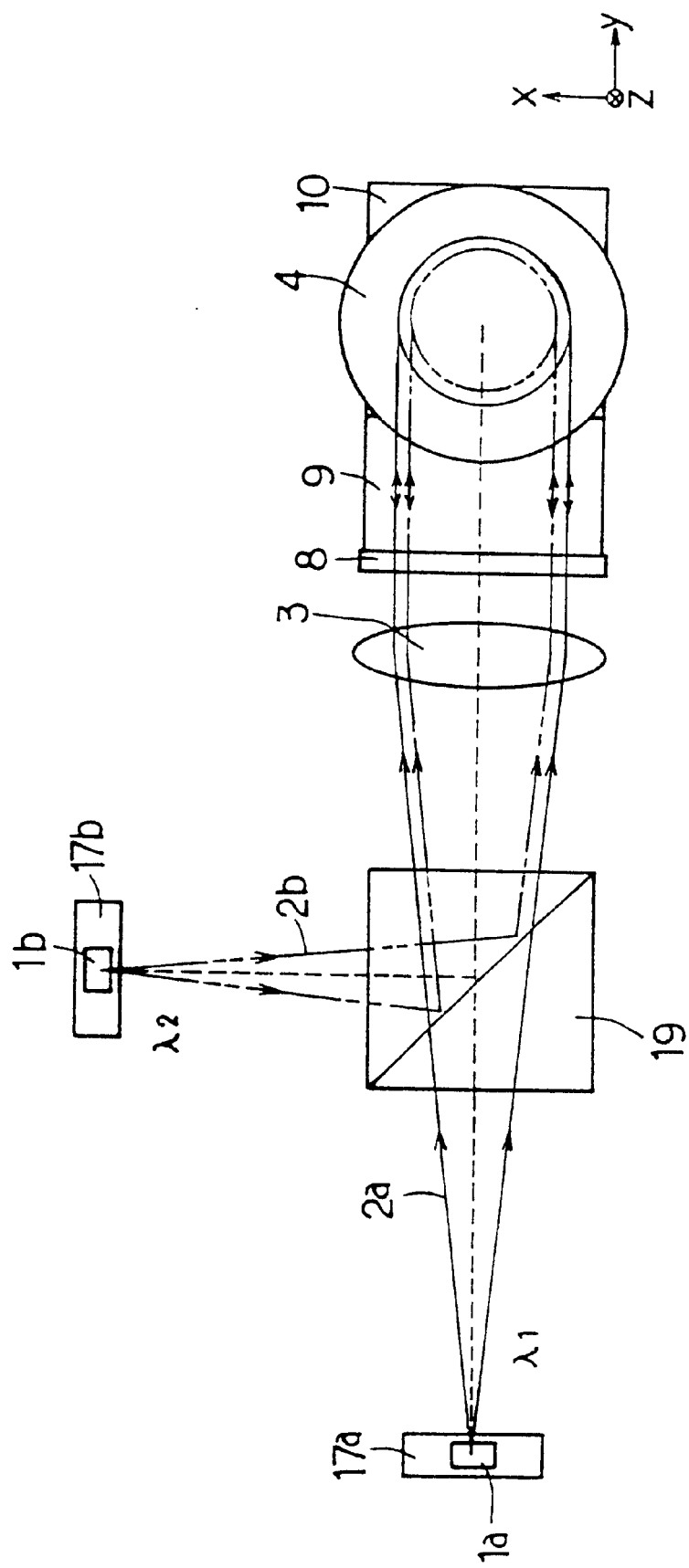
FIG. 11(b) is a plan view of the same.
Figure 12:
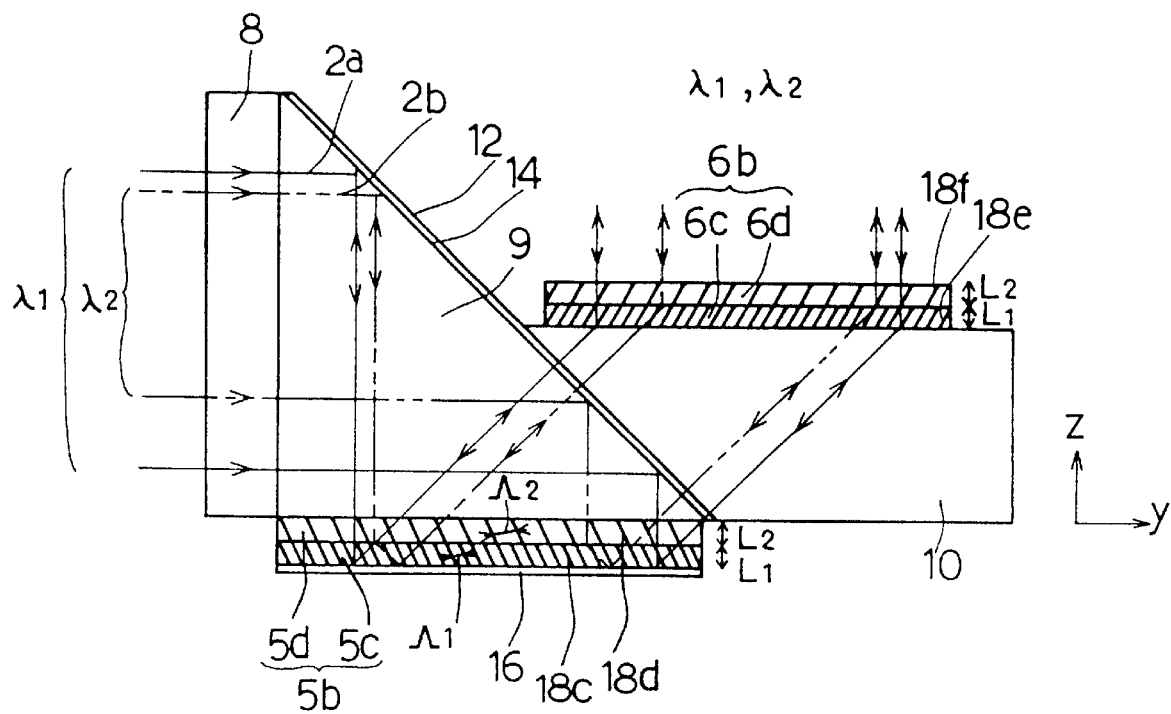
FIG. 12 is a side elevation detailing a central portion of the optical head according to the fourth embodiment of the present invention and the first and second grating elements in this central portion.

FIG. 11(a) is a side elevation of the basic structure of an optical head according to the fourth embodiment of the present invention and its light transmission paths. FIG. 11(b) is a plan view of this basic structure. FIG. 12 is a side elevation detailing a central portion of the optical head according to this embodiment and the first and the second grating element in this central portion.

As can be seen in FIG. 11, the optical head of this embodiment utilizes two wavelengths, and comprises, for example, a semiconductor laser light source 1a with a wavelength $\lambda_1$=0.655 µm for DVDs, and a semiconductor laser light source 1b with a wavelength $\lambda_1$=0.795 µm for CD-Rs and CDs. The light sources 1a and 1b are incorporated in light-source/photo-detector modules 17a and 17b. Moreover, as can be seen in FIG. 12, the first and the second grating elements 5b and 6b also have a structure that is adapted to two wavelengths. This means, a two-layered first grating element 5b, which has a reflective film 16 of, for example, Al or Au on a surface, is formed on the bottom face of the first transparent substrate 9. The two-layered structure includes refractive index distribution layers 5c and 5d that are adapted to the two wavelengths. Their thickness and period changes corresponding to wavelengths, for example, $L_1$=7 µm, $L_2$=8.5 µm, $\Lambda_1$=0.57 µm and $\Lambda_2$=0.69 µm. When the thicknesses of the refractive index distributions layers 5c and 5d are substantially proportional to the wavelengths, then the tolerance for the diffraction efficiency at these wavelengths can be made equal. Fringes 18c and 18d with a periodic refractive index distribution are inclined in the negative y-axis direction. This inclination angle is the same for both layers, for example 22.5°, i.e. half of the diffraction angle.

Similarly, the second grating element 6b also comprises a two-layered structure of the two refractive index distribution layers 6c and 6d. The refractive index distribution layer 6c is the same as the refractive index distribution layer 5c, and the refractive index distribution layer 6d is the same as the refractive index distribution layer 5d, except for the inclination angle or the inclination orientation of the fringes 18e and 18f. This inclination angle of the fringes 18e and 18f is for example 22.5°, i.e. half of the diffraction angle.

By providing the two layers in the grating elements with the same inclination angle of the fringes 18, the inclination of the optical axis of the diffracted light between the first grating element 5b and the second grating element 6b is made equal for both wavelengths.

The refractive index distribution layers 5c and 6c diffract the laser beam 2a with the wavelength $\lambda_1$=0.655 µm by Bragg diffraction, but since the Bragg condition is not satisfied for the laser beam of the other wavelength $\lambda_2$=0.795 µm, they substantially transmit this laser beam. Similarly, the refractive index distribution layers 5d and 6d diffract the laser beam 2b with the wavelength $\lambda_2$=0.795 µm by Bragg diffraction, but since the Bragg condition is not satisfied for the laser beam of the other wavelength $\lambda_1$=0.655 µm, they substantially transmit this laser beam.

Moreover, by providing the fringes 18 in the two-layered grating elements with slightly different (for example, about 1° to 5°) angles, the generation of unnecessary diffracted light in the layer that does not correspond to the wavelength of this light can be reduced. Taking the first grating element 5b as an example, this means that the refractive index distribution layer 5c corresponds to the wavelength $\lambda_1$, but since light passes also through the other refractive index distribution layer 5d, a small amount of light is also diffracted in this layer. Now, when the inclination angle of the fringes 18d in the refractive index distribution layer 5d is a little different from the inclination angle of the fringes 18c in the refractive index distribution layer 5c, then the Bragg condition is even less satisfied, so that unnecessary light diffraction can be reduced and the light utilization efficiency can be increased.

The optical head of this embodiment comprises a beam splitter 19 in its optical path, as indicated in FIG. 11, so that the laser beams 2a and 2b emitted from the light sources 1a and 1b enter the same collimator lens 3. The distance between the collimator lens 3 and the light source 1b is, for example, only 5 mm, and is shorter than the distance between the collimator lens 3 and the light source 1a. Thus, from the light that passes the collimator lens 3, the beam that corresponds to the wavelength $\lambda_1$ is turned into parallel light and the beam that corresponds to the wavelength $\lambda_2$ is turned into light that is a little divergent with a maximum divergence angle of 1.2°. Accordingly, the focus for the wavelength $\lambda_2$ is on a larger z-axis coordinate than the focus for the wavelength $\lambda_1$, so that the foci can correspond to an optical disk 11a or an optical disk 11a.

Moreover, a donut-shaped multi-layered film with wavelength-selectivity that lets only the wavelength $\lambda_1$ pass is formed on a circumference of the second grating element 6b, so that light of the wavelength $\lambda_2$ can enter the objective lens 4 only in a controlled aperture. This lowers the NA for light of the wavelength $\lambda_2$ substantially.

If the two wavelengths $\lambda_1$ and $\lambda_2$ are adjusted in the ranges $0.60 \mu m \leq \lambda_1 \leq 0.68 \mu m$ and $0.76 \leq \lambda_2 \leq 0.87 \mu m$, then unnecessary diffracted light of other wavelengths can be reduced in the first and the second two-layered grating elements 5b and 6b, so that, for example, DVDs, CD-Rs and CDs can be read favorably.

Figure 13A:
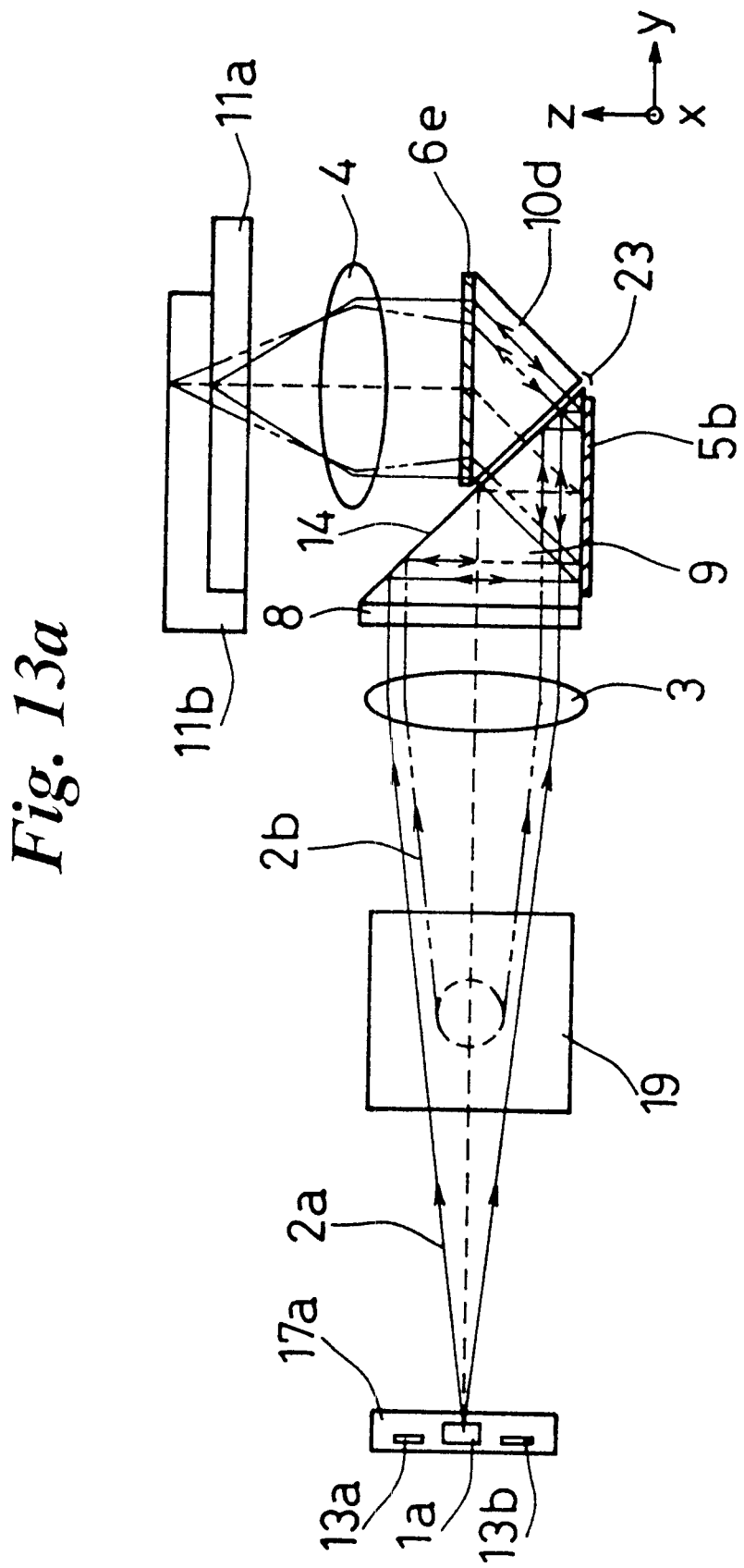
FIG. 13(a) is a side elevation of the basic structure of another optical head according to the fourth embodiment of the present invention and its light transmission paths.
Figure 13B:
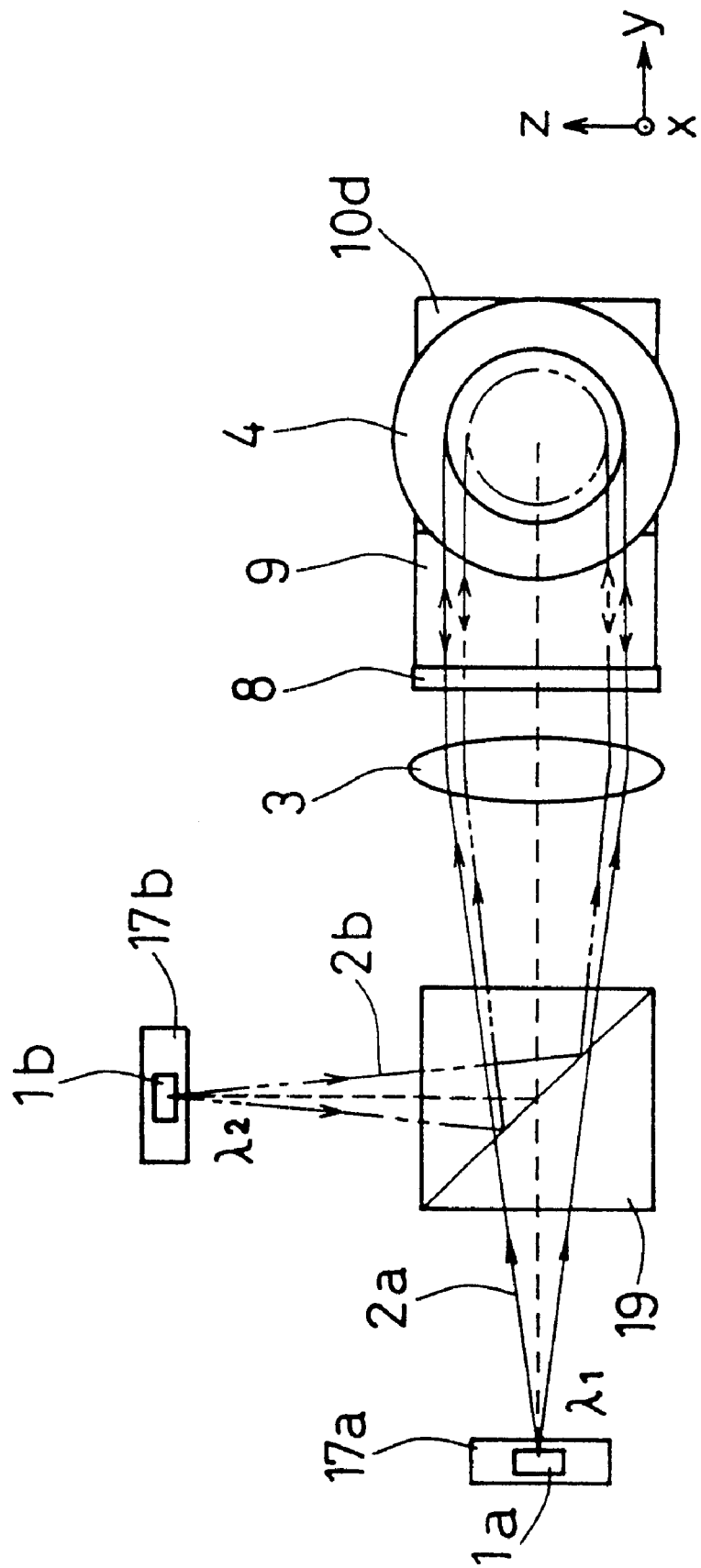
FIG. 13(b) is a plan view of the same.
Figure 14:
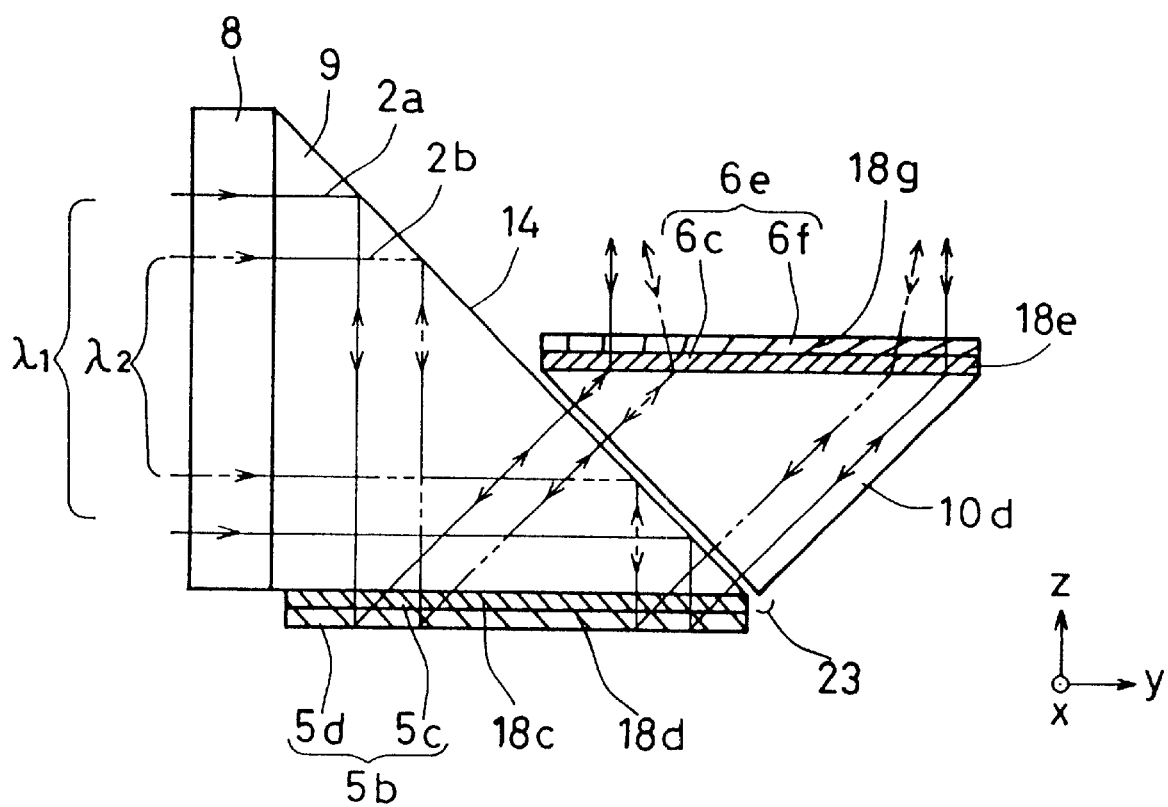
FIG. 14 is a side elevation detailing a central portion of the other optical head according to the fourth embodiment of the present invention and the first and second grating elements in this central portion.

In this embodiment, the first transparent substrate 9 and the second transparent substrate 10 were attached and integrated by a multi-layered film 12. However, the present invention is not limited to such a structure. A structure is also possible, where there is only an air gap 23 between the first transparent substrate 9 and the second transparent substrate 10d, as illustrated in FIGS. 13 and 14, although the structure including 12 multi-layered film 12 between the first transparent substrate 9 and the second transparent substrate 10, as shown in FIGS. 11 and 12, is more stable and thus more preferable.

Furthermore, in this embodiment, a transparent substrate 10 whose cross-section has a trapezoidal shape is used for the second transparent substrate. However, the present invention is not limited to such a structure. The second transparent substrate should have a form that can ensure the light path of the laser beam 2, and a surface with the second grating element 6 on the side of the objective lens 4. The second transparent substrate 10d can also be a triangular prism, as shown in FIGS. 13 and 14, just as the first transparent substrate 9.

Of the refractive index distribution layers 5c and 5d constituting the two-layered first grating element 5b in this embodiment, the refractive index distribution layer 5d, which has the larger period, contacts the first transparent substrate 9. However, the present invention is not limited to this configuration, and it is also possible that of the refractive index distribution layers 5c and 5d constituting the two-layered first grating element 5b in this embodiment, the refractive index distribution layer 5c, which has the smaller period, contacts the first transparent substrate 9, as shown in FIG. 14. The same is true for the second grating element 6b. When such a configuration is adopted, the first grating element 5b and the second grating element 6b can be produced in the same process, which facilitates the manufacturing of the first and the second grating elements 5b and 6b.

The inclination angles of the fringes 18e and 18f in the refractive index distribution layers 6c and 6d constituting the two-layered second grating element 6b in this embodiment are the same. However, the present invention is not limited to this configuration, and it is possible, for example, to arrange the refractive index distribution layers 6c and 6f constituting a two-layered second grating element 6e as shown in FIG. 14. Toward the right side in FIG. 14, the inclination angle of the fringes 18g of the refractive index distribution layer 6f near the objective lens 4 becomes gradually larger than the inclination angle of the fringes 18e of the refractive index distribution layer 6c (for example +1° on a right edge portion compared to a central portion of the refractive index distribution layer 6f). Toward the left side, the inclination angle of the fringes 18g becomes gradually smaller than the inclination angle of the fringes 18e (for example −1° on a left edge portion compared to a central portion of the refractive index distribution layer 6f). This leads to the following effects: The Bragg condition on the entire surface of the second grating element 6f is satisfied, and the diffraction efficiency on a periphery of the second grating element 6f does not decrease anymore, so that a high efficiency can be attained. In this case, it is necessary to collimate both of the beams with the wavelength $\lambda_1$ and $\lambda_2$ by adjusting the distance between the collimator lens 3 and the light source 1a and the distance between the collimator lens 3 and the light source 1b to the same distance, as shown in FIG. 13. This embodiment is adapted for two wavelengths. However, the present invention is not limited to this configuration, and it can also be adapted to three wavelengths or more. In this case, the first and the second grating elements comprise multi-layered volume holograms, wherein each layer corresponds to one wavelength. With such a configuration, several kinds of disks which are designed to a different wavelength can be used. In such a configuration, it is preferable that the thicknesses of the multi-layered holograms differ in accordance with the corresponding wavelength. In this case, the tolerance of the diffraction efficiency for each wavelength can be adjusted to an optimum for each corresponding optical disk.

For example, for three wavelengths $\lambda_1$, $\lambda_2$, and $\lambda_3$, the first and the second grating elements comprise three-layered volume holograms wherein each layer corresponds to one of the wavelengths $\lambda_1$, $\lambda_2$, or $\lambda_3$. Setting $0.38 \mu m \leq \lambda_1 \leq 0.52 \mu m$, $0.60 \mu m \leq \lambda_2 \leq 0.68 \mu m$, and $0.76 \mu m \leq \lambda_3 \leq 0.87 \mu m$, unnecessary diffracted light of other wavelengths in the three-layered first and second grating elements can be reduced, and many optical disks such as high-density optical disks of more than 10 Gbyte capacity, DVDs, DVD-Rs, CDs, and CD-Rs can be read without difficulties.

Fifth Embodiment

An optical head according to a fifth embodiment of the present invention is explained with reference to FIG. 15, with emphasis on its differences versus one according to the second embodiment of the present invention.

Figure 15:
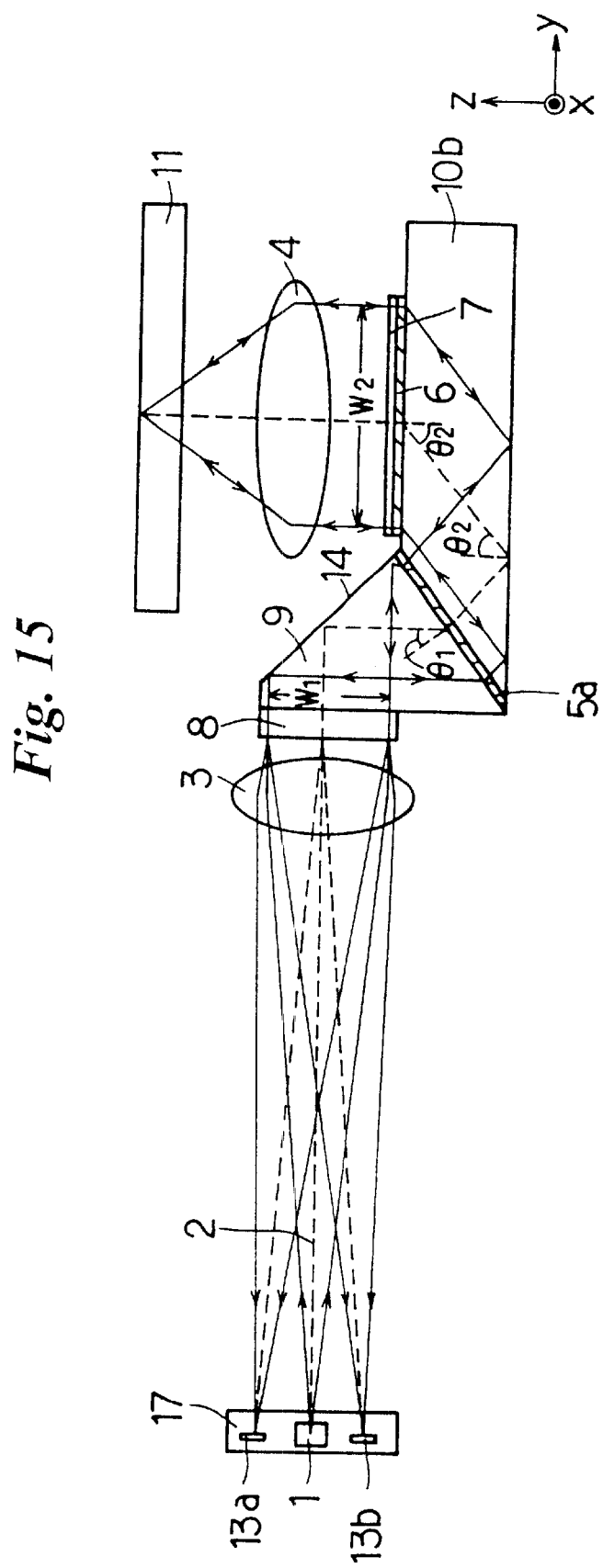
FIG. 15 is a side elevation of the basic structure of an optical head according to a fifth embodiment of the present invention and its light transmission paths.

FIG. 15 is a side elevation of the basic structure of an optical head according to the fifth embodiment of the present invention and its light transmission paths.

The optical systems for the optical heads in the preceding embodiments are not beam-forming, but the optical system for the optical head of this embodiment also has a beam-forming function.

A first grating element 5a is a transmission element. A first incidence angle $\theta_1$ defined by the optical axis of the laser beam 2 from the light path alteration member 14 to the first grating element 5a and the normal on the first grating element 5a is larger than an outgoing angle defined by the optical axis of diffracted light from the first grating element 5a and the normal on the first grating element 5a. A second incidence angle $\theta_2$ defined by the optical axis of the laser beam 2 from the bottom face of the second transparent substrate 10b to the second grating element 6 and the normal on the second grating element 6 is larger than an incidence angle defined by the normal on the second grating element 6 and the optical axis of the light diffracted by the second grating element 6. In FIG. 15, the outgoing angles of the diffracted light from the first and the second grating element 5a and 6 are 0°. The first transparent substrate 9 and the second transparent substrate 10b, on a surface of which the second grating element 6 is formed, sandwich the first grating element 5a, and are thus integrated into one component.

The laser beam 2 emitted from the light source 1 is collimated to parallel light by the collimator lens 3. The beam diameter in the z-axis direction is $w_1$, the beam diameter in the x-axis direction is $W_3$ (not shown in the drawing) and the beam diameter in the y-axis direction after leaving the second grating element 6 is $w_2$ (and the beam diameter in the x-axis direction $W_3$ stays unaltered). In this case, $w_2/w_1 > 1$.

Generally, the beam emitted from a semiconductor laser source 1 is an elliptical beam, and to raise the light utilization efficiency, the beam has to be shaped from an elliptical beam to a circular beam.

The light source 1 of this embodiment emits a light beam that is elongated in the x-axis direction, because the laser beam 2 is P-polarized. This beam is deflected by the light path alteration member 14 in the negative z-axis direction and enters the first grating element 6a at an angle of, for example, $\theta_1 = 45°$. The first-order diffraction light leaves the first grating element 5a at a right angle with a magnified beam diameter of $w_1/\cos\theta_1$. The first-order diffraction light leaving the first grating element 5a at a right angle is totally reflected by the bottom face of the second transparent substrate 10b, and enters the second grating element 6 at an angle of, for example $\theta_2 = 45°$. The first-order diffraction light leaves the second grating element 6 at a right angle with a magnified beam diameter of $w_2 = w_1/(\cos\theta_1 \times \cos\theta_2)$. If, for example, $\theta_1 = \theta_2 = 45°$, then $w_2 = 2w_1$, a twofold magnification. If $\theta_1 = \theta_2 = 52°$, then $w_2 = 2.6 w_1$, and the elliptical beam emitted from the light source 1 can be shaped into an almost perfectly circular beam. $\theta_1$, $\theta_2 = \approx 52°$ is the most preferable range, but a favorable beam shape can be attained and the light utilization efficiency can be raised when $\approx 45° \leq \theta_1, \theta_2 \leq \approx 60°$. Especially, a favorable beam shape can be attained when the outgoing angle of the diffracted light from the first and the second grating elements 5a and 6 is about 0°, as illustrated in FIG. 15.

Sixth Embodiment

An optical head according to a sixth embodiment of the present invention is explained with reference to FIG. 16, with emphasis on its differences versus one according to the fifth embodiment of the present invention.

Figure 16:
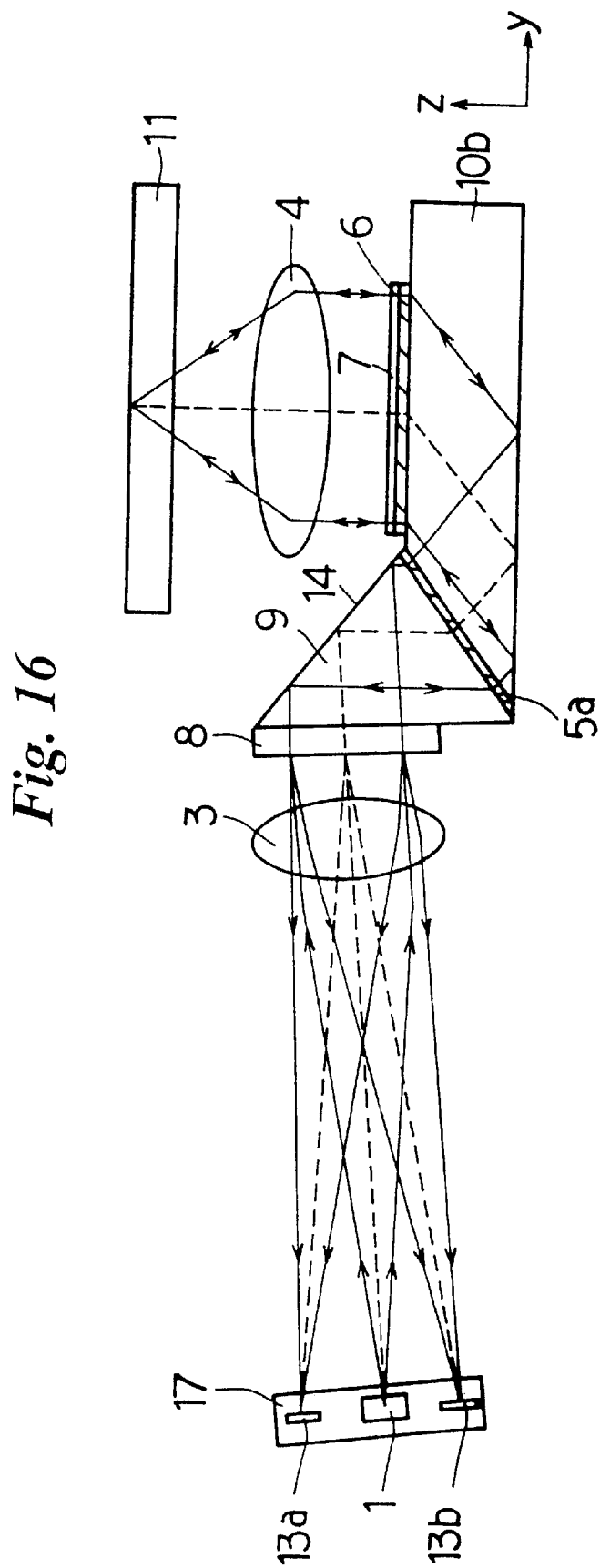
FIG. 16 is a side elevation of the basic structure of an optical head according to a sixth embodiment of the present invention and its light transmission paths.

FIG. 16 is a side elevation of the basic structure of an optical head according to the sixth embodiment of the present invention and its light transmission paths.

In the optical head of this embodiment, the optical axis between the light source 1 and the light path alteration member 14 is slightly tilted, for example about 5°, from y-axis direction into the z-axis direction, as indicated in FIG. 16. Accordingly, the light-source/photo-detector unit 17, the collimator lens 3, and the focus/track error signal detection element 8 are also tilted. The laser beam is reflected exactly in the negative z-axis direction by adjusting the angle of the light path alteration member 14. Due to this arrangement, the space below the light-source/photo-detector unit 17, can be utilized effectively. Since additional space is won between the optical disk 11 and the optical elements 3 and 17 etc., arrangement and adjustment become easier.

Seventh Embodiment

An optical head according to a seventh embodiment of the present invention is explained with reference to FIG. 17, with emphasis on its differences versus one according to the fifth embodiment of the present invention.

Figure 17:
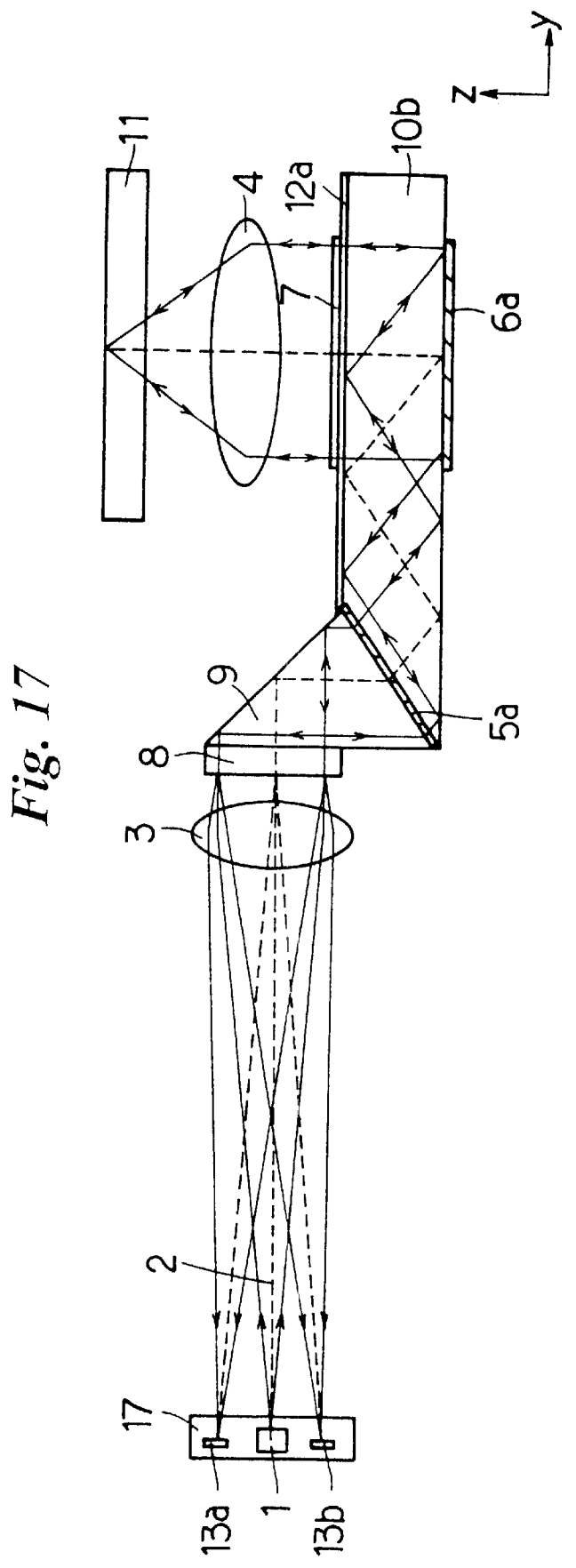
FIG. 17 is a side elevation of the basic structure of an optical head according to a seventh embodiment of the present invention and its light transmission paths.

FIG. 17 is a side elevation of the basic structure of an optical head according to the seventh embodiment of the present invention and its light transmission paths.

A second grating element 6a serves as a reflection element in the optical head of this embodiment, and a second grating element 6a is formed on the back face of a second transparent substrate 10b, as shown in FIG. 17. On the upper face of the second transparent substrate 10b, a multi-layered film 12a is formed, which comprises a ¼ wavelength plate 7 on is upper surface.

By providing a reflection element as the second grating element 6a, the space between the first transparent substrate 9 and the objective lens 4 can be enlarged, so that an actuator for controlling the objective lens 4 (not shown in the drawing) can be fitted easily. The multi-layered film 12a impedes any influence of the ¼ wavelength plate 7 by isolating it when the light is reflected completely within the second transparent substrate 10b, Eighth Embodiment An optical head according to an eighth embodiment of the present invention is explained with reference to FIG. 18, with emphasis on its differences versus one according to the seventh embodiment of the present invention.

Figure 18:
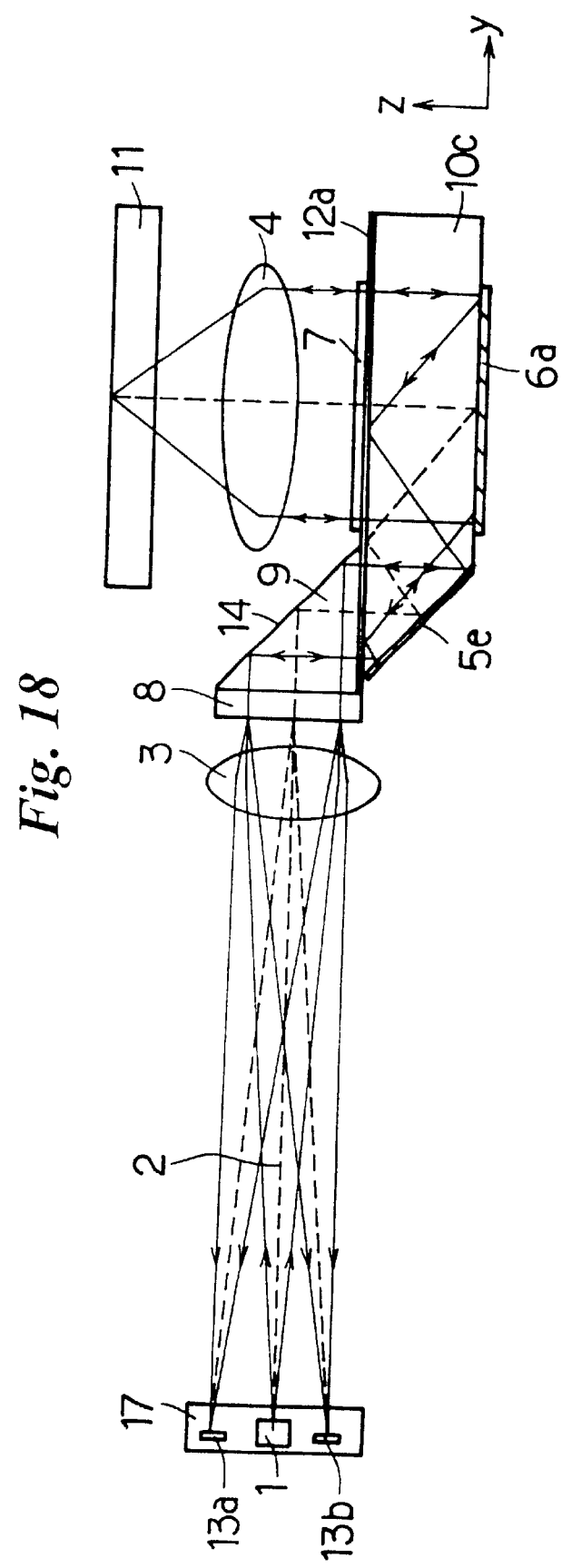
FIG. 18 is a side elevation of the basic structure of an optical head according to an eighth embodiment of the present invention and its light transmission paths.

FIG. 18 is a side elevation of the basic structure of an optical head according to the eighth embodiment of the present invention and its light transmission paths.

A first grating element 5e serves as a reflection element in the optical head of this embodiment, and this first grating element 5e is formed on the slanted face of a second transparent substrate 10c, as shown in FIG. 18. A multi-layered film 12a is formed on an upper face of the second transparent substrate 10c, and the first transparent substrate is provided on a left portion of this multi-layered film 12.

By providing a reflection element as the first grating element 5e, it becomes unnecessary to provide a first grating element 5e between the first transparent substrate 9 and the second transparent substrate 10c, so that the structure becomes more stable and its assembly easier.

Ninth Embodiment

An optical head according to an ninth embodiment of the present invention is explained with reference to FIG. 19, with emphasis on its differences versus one according to the first embodiment of the present invention.

Figure 19:
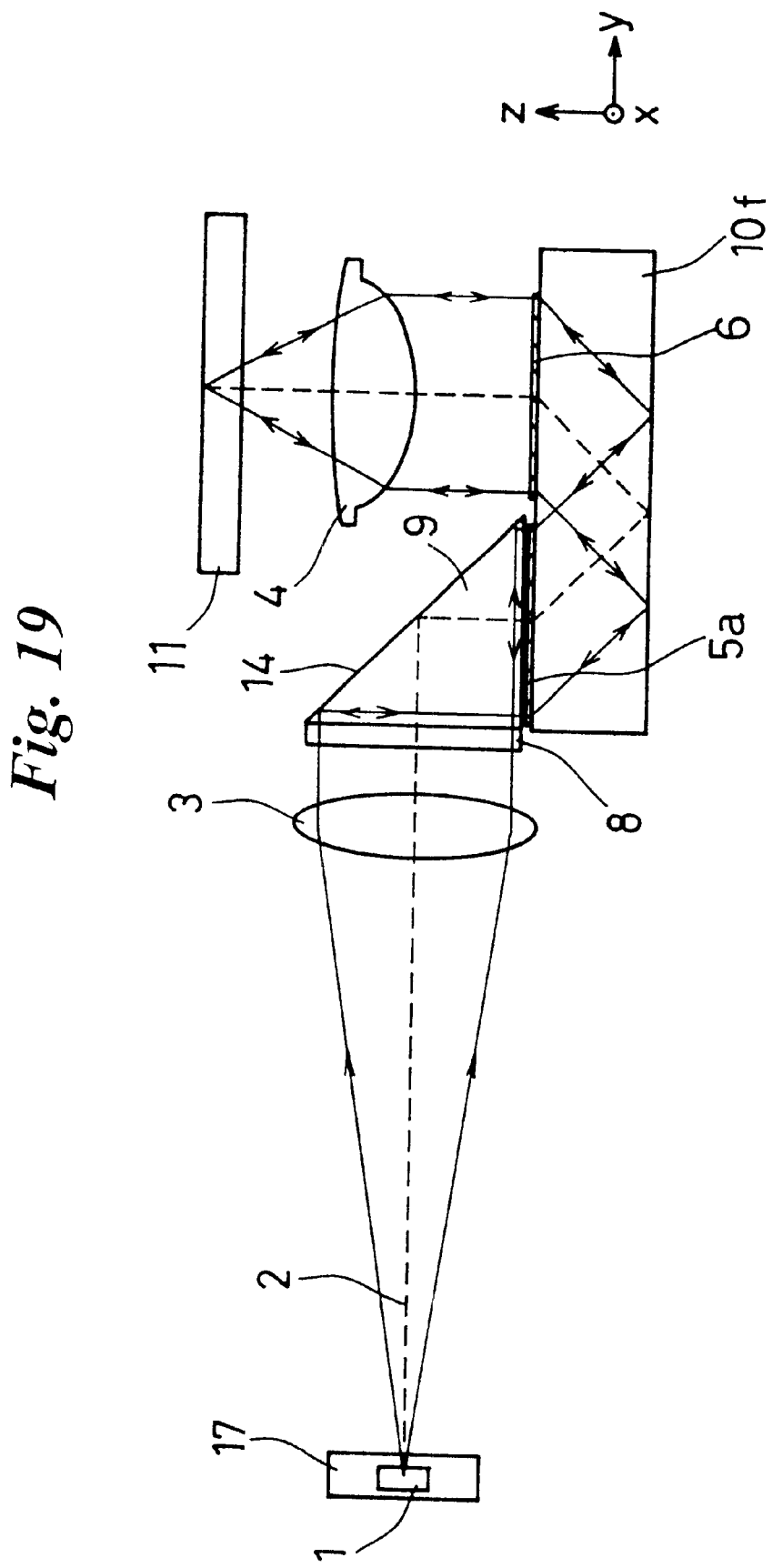
FIG. 19 is a side elevation of the basic structure of an optical head according to a ninth embodiment of the present invention and its light transmission paths.

FIG. 19 is a side elevation of the basic structure of an optical head according to the ninth embodiment of the present invention and its light transmission paths.

As is shown in FIG. 19, this embodiment uses a planar second transparent substrate 10f for the second transparent substrate. A first and a second grating element 5a and 6 are formed on a surface of the second transparent substrate 10f. The first and the second grating elements 5a and 6 are both transmission elements. A first transparent substrate 9, which is a triangular prism, is arranged so that the first grating element 5a is sandwiched between the lower face of the first transparent substrate 9 and the upper face of the second transparent substrate 10f. A slanted face of this first transparent substrate 9 serves as the light path alteration member 14.

The laser beam 2, which has been collimated into parallel light by the collimator lens 3, is totally reflected by the light path alteration member 14 in the negative z-axis direction, passes through the first grating element 5a, and enters the second transparent substrate 10f. Then laser beam 2 is once totally reflected at the bottom face of the second transparent substrate 10f, and enters the second grating element 6.

Thus, by using a planar second transparent substrate 10f for the second transparent substrate, a large number of transparent substrates can be cut easily from a larger glass substrate, just by cutting it vertically, so that productivity can be raised and costs can be lowered. Moreover, both the first and the second grating elements 5a and 6 deform in the same manner when disturbed by, for example, temperature changes, because transmission elements are used for both elements. A canceling effect arises from this symmetry, so that this structure is especially resistant against external influences. Moreover, forming the first and the second grating elements 5a and 6 on the same surface of the second transparent substrate 10f facilitates the production of the first and the second grating elements 5a and 6.

Tenth Embodiment

An optical head according to a tenth embodiment of the present invention is explained with reference to FIG. 20, with emphasis on its differences versus one according to the ninth embodiment of the present invention.

Figure 20:
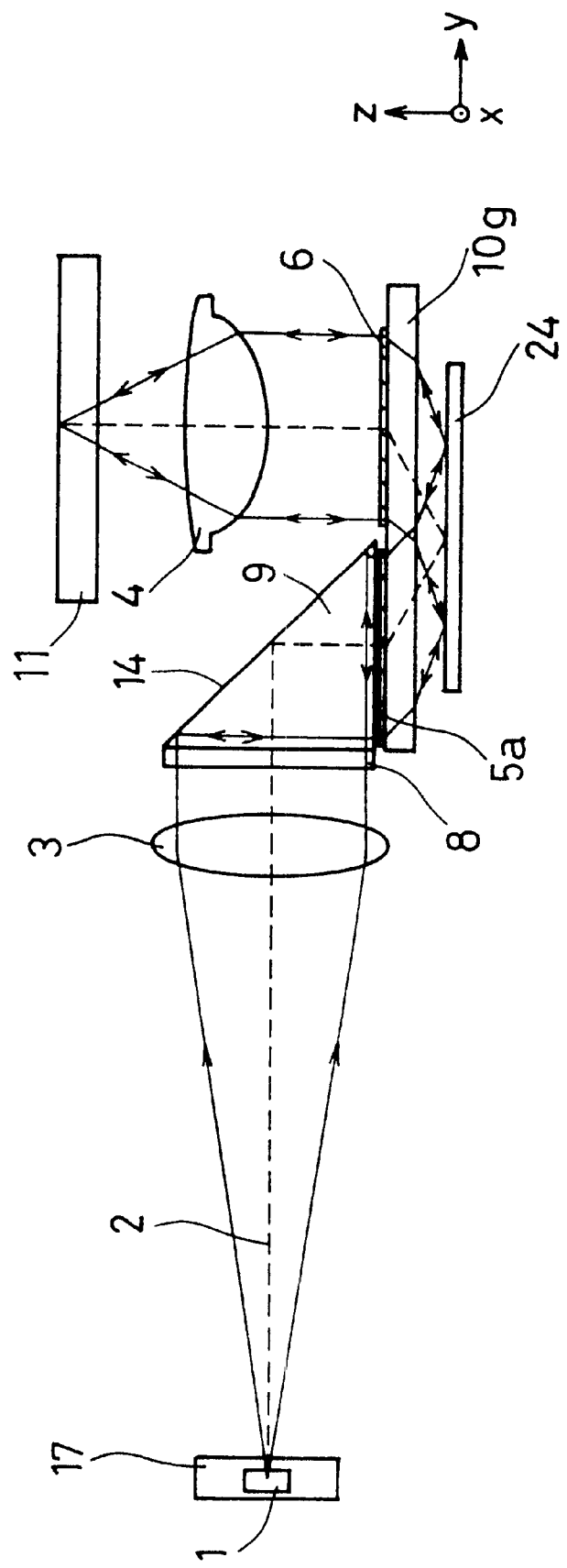
FIG. 20 is a side elevation of the basic structure of an optical head according to a tenth embodiment of the present invention and its light transmission paths.

FIG. 20 is a side elevation of the basic structure of an optical head according to the tenth embodiment of the present invention and its light transmission paths.

As is shown in FIG. 20, a reflection plate 24 is provided on a back face side of a planar second transparent substrate 10g of the optical head in this embodiment, separated by an air layer.

The laser beam 2, which has been collimated into parallel light by the collimator lens 3, is totally reflected by the light path alteration member 14 in the negative z-axis direction, passes through the first grating element 5a, and enters the second transparent substrate 10g. Then, the light refracted into the air layer from the second transparent substrate 10g is reflected by the reflection plate 24 and enters the second grating element 6.

Thus, by providing a reflection plate 24 separated by an air layer at the back face side of the second transparent substrate 10g, the laser beam 2 passes through the first grating element 5a, enters the second transparent substrate 10g, is refracted at the border between the second transparent substrate 10g and the air layer, reflected at the reflection plate 24, and enters the second grating element 10g. Thus, the total thickness of the second transparent substrate 10g, the air layer and the reflection plate 24 can be made thinner than the thickness of the second transparent substrate 10g in the ninth embodiment. As a result, the optical head of this embodiment can be made thinner than the optical head of the ninth embodiment.

Eleventh Embodiment

An optical head according to an eleventh embodiment of the present invention is explained with reference to FIG. 21.

In the preceding embodiments, a light path alteration member was arranged in the light path between the light source and the first grating element. However, the present invention is not limited to this configuration, and it is also possible to arrange a light path alteration member in the light path between the second grating element and the objective lens.

Figure 21:
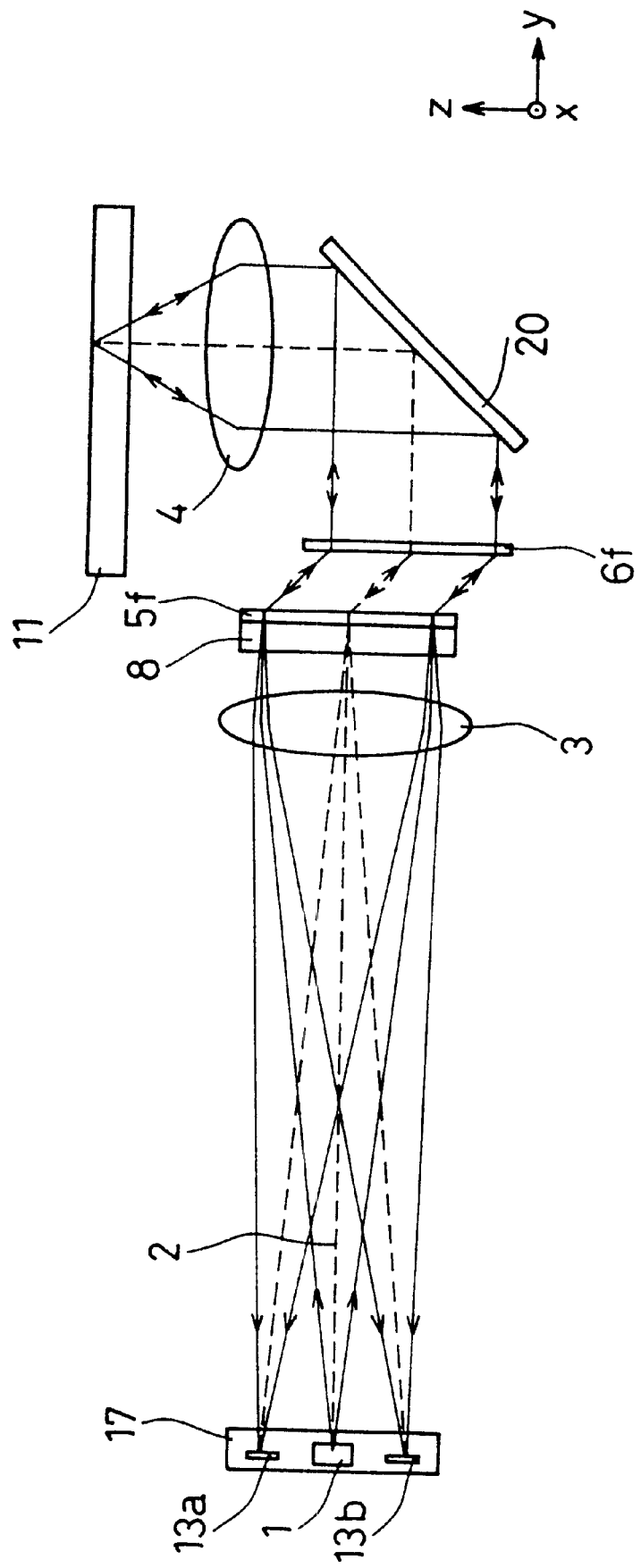
FIG. 21 is a side elevation of the basic structure of an optical head according to a eleventh embodiment of the present invention and its light transmission paths.

FIG. 21 is a side elevation of the basic structure of an optical head according to the eleventh embodiment of the present invention and its light transmission paths.

As shown in FIG. 21, a first grating element 5f, a second grating element 6f and a light path alteration member 20 are arranged in the light path of the optical head of this embodiment between the light source 1 and the optical disk, which is a recording medium such as a DVD or a CD. The light source 1 and the photo-detectors 13a and 13b are integrated into a light-source/photo-detector unit 17. In this embodiment, the first and the second grating elements 5f and 6f are both transmission elements.

A collimator lens 3 collimating the laser beam 2 emitted from the light source 1 in the y-axis direction into parallel light, and a focus/track error signal detection element 8 are arranged in the light path between the light source 1 and the first grating element 5f. In this embodiment, the focus/track error signal detection element 8 includes, for example, a resin plate or a glass plate, and a hologram element on a surface thereof, and is integrated with the first grating element 5f into one component. The second grating element 6f is arranged in parallel to the first grating element 5f, and shifted in the negative z-axis direction. A light path alteration member 20 including a mirror is arranged at an angle of 45° slanted with respect to the second grating element 6f. This light path alteration member 20 reflects the light diffracted from the second grating element 6f into the z-axis direction and directs it to the objective lens 4.

The, for example, S-polarized laser beam 2 is emitted in the y-axis direction from a semiconductor laser light source 1 with a wavelength $\lambda=0.655$ μm. The laser beam 2 is collimated by the collimator lens 3 into parallel light with a beam diameter of, for example, 2.8 mm, passes the focus/track error signal detection element 8 (utilizing zero-order diffraction light) and enters the first grating element 5f. Then, the first-order diffraction light passed and diffracted at an angle of, for example, 45° enters the second grating element 6f at an angle of 45°. Then, the first-order diffraction light diffracted into the y-axis direction at an angle of, for example, 45° is reflected into the z-axis direction by the light path alteration member 20, and focused on the optical disk 11 by the objective lens 4.

The laser beam 2 is reflected by the optical disk 11 and returns in the opposite direction, through the objective lens 4, the light path alteration member 20, the second grating element 6f, the first grating element 5f, and then through the focus/track error signal detection element 8, which divides the beam (utilizing first-order diffraction light). Finally the beam is detected by the photo-detectors 13a and 13b.

In the optical head of this embodiment, the optical axis of the laser beam 2 emitted from the light source 1 can be shifted in the z direction, i.e. the direction to the optical disk 11. As a result, the space for arranging objective lens 4 can be enlarged, so that an actuator for controlling the objective lens 4 (not shown in the drawing) can be fitted easily.

Twelfth Embodiment

An optical head according to a twelfth embodiment of the present invention is explained with reference to FIG. 22.

Figure 22:
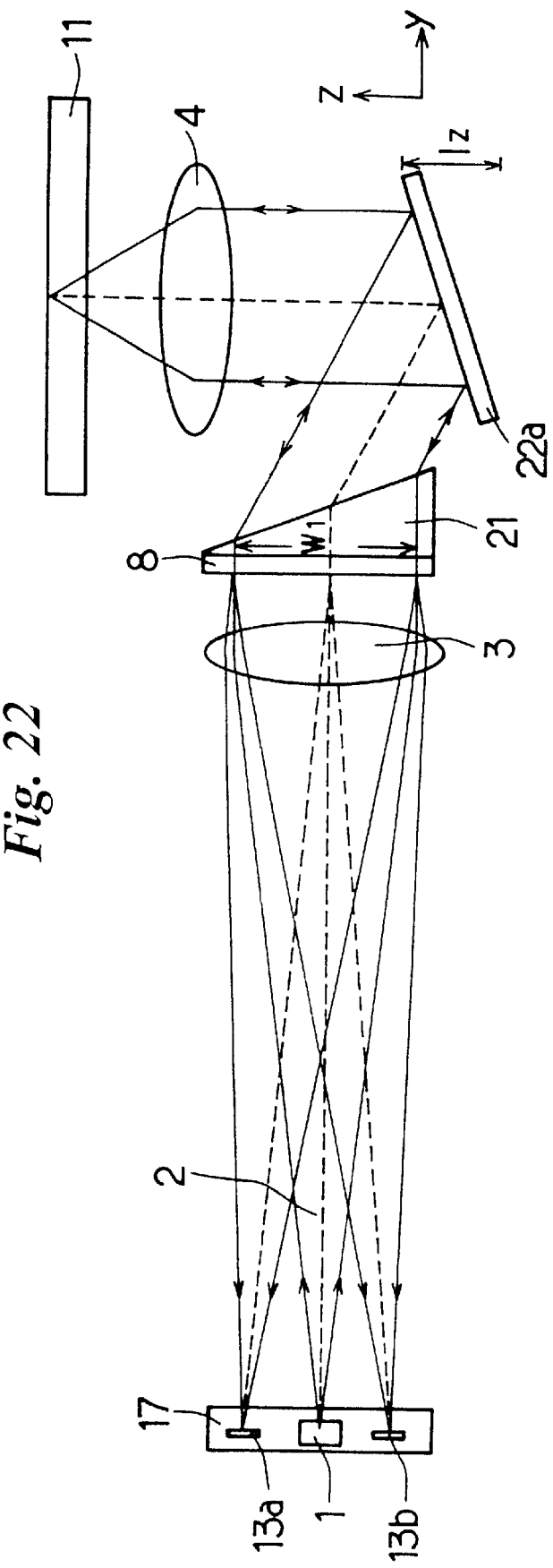
FIG. 22 is a side elevation of the basic structure of an optical head according to a twelfth embodiment of the present invention and its light transmission paths.

FIG. 22 is a side elevation of the basic structure of an optical head according to the twelfth embodiment of the present invention and its light transmission paths.

As is shown in FIG. 22, the optical head of this embodiment comprises a light source 1 emitting a light beam 2 in a first direction (y-axis direction), first deflector 21, for example a prism, for deflecting the light beam 2 from the first direction into a second direction (to the lower right side), second deflector 22a, for example a mirror, for deflecting the light beam 2 deflected by the first deflector 21 into a third direction (z-axis direction), and an objective lens 4 for focusing the light beam 2 deflected by the second deflector 22a onto an optical disk 11. The third direction is substantially perpendicular to the recording surface of the optical disk 11. The length lz of the second deflector 22a in the third direction is smaller than the width $w_1$ in the third direction of the light beam 2 travelling in the first direction. A triangular prism can be used for the first deflector 21, and a collimator lens 3 and a focus/track error signal detection element 8 are arranged in the light path between the light source 1 and the first deflector 21.

Figure 24:
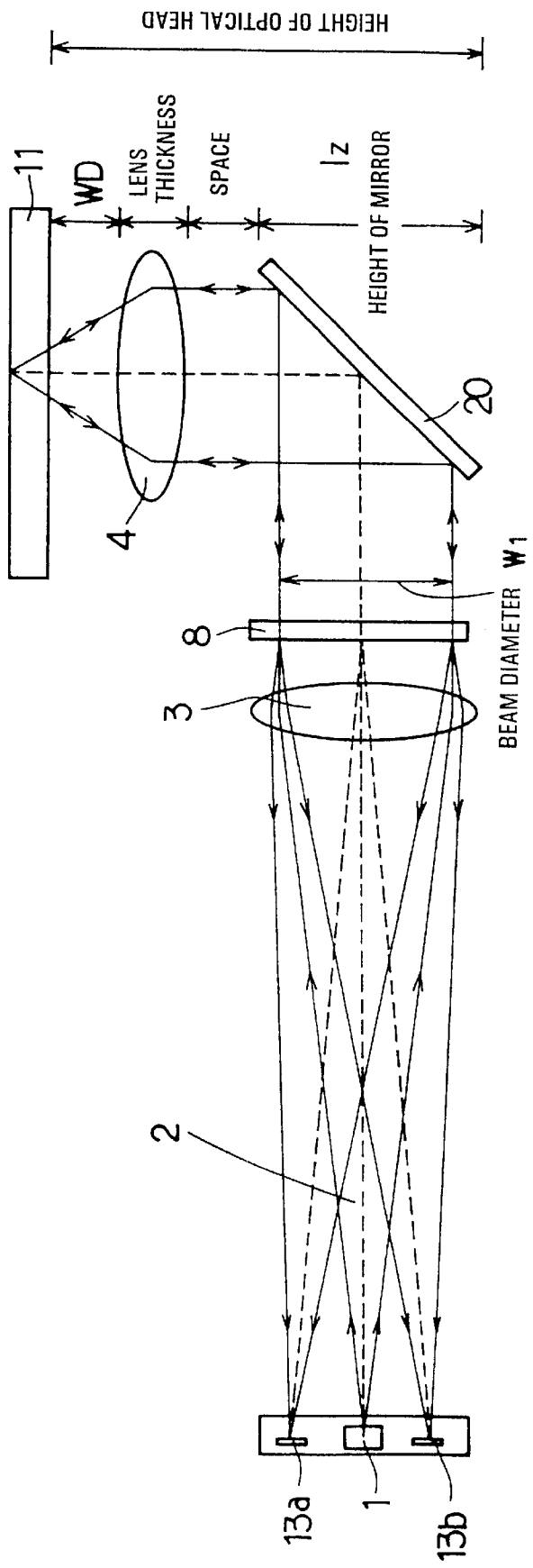
FIG. 24 is a side elevation of the structure of a conventional optical head.

In conventional optical heads, $w_1 \leq lz$ (see FIG. 24), but in the optical head of this embodiment the laser beam 2 emitted from the light source 1 is deflected in a diagonal direction (the second direction) by the first deflector 21, so that the incidence angle into the second deflector 22a can be tilted with respect to the y-axis direction, and the height lz of the second deflector 22a, which is opposed to the objective lens 4, can be reduced ($w_1 < lz$), and a thinner optical head can be achieved.

Thirteenth Embodiment

An optical head according to a thirteenth embodiment of the present invention is explained with reference to FIG. 23, with emphasis on its differences versus one according to the twelfth embodiment of the present invention.

Figure 23:
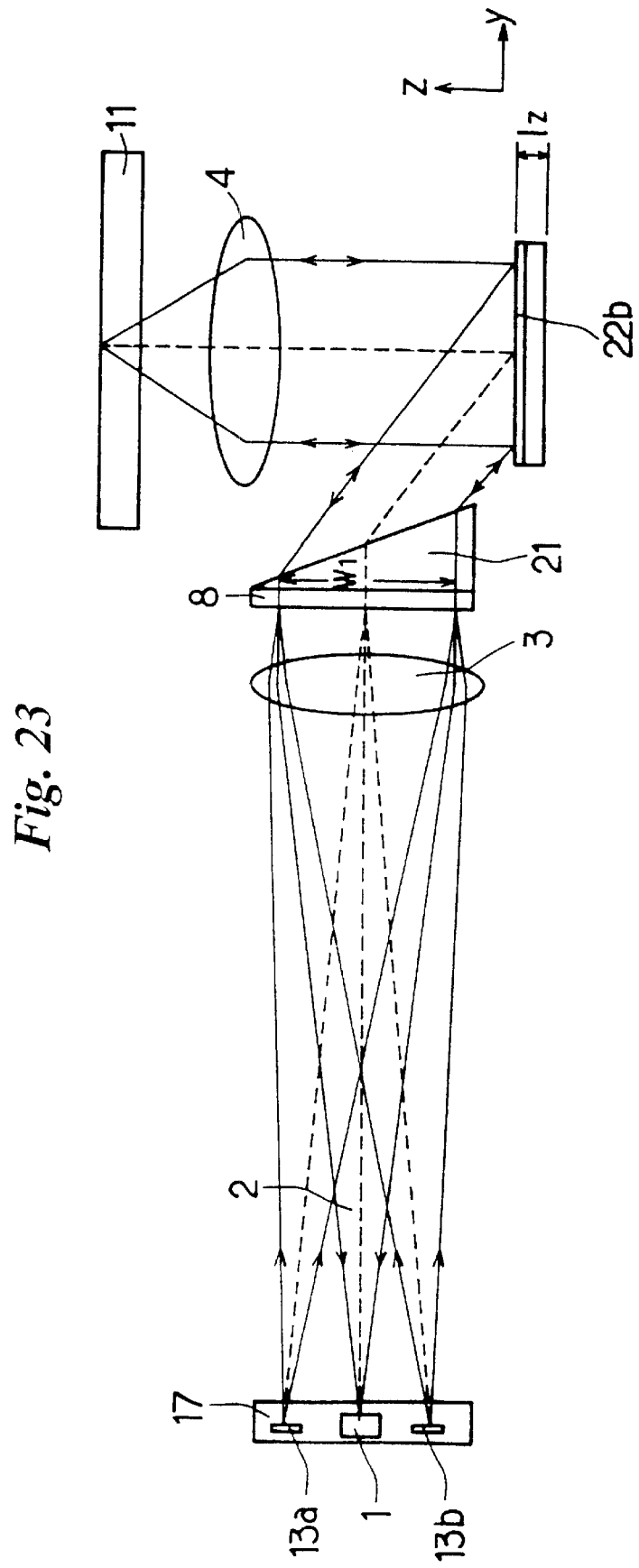
FIG. 23 is a side elevation of the basic structure of an optical head according to thirteenth embodiment of the present invention and its light transmission paths.

FIG. 23 is a side elevation of the basic structure of an optical head according to the thirteenth embodiment of the present invention and its light transmission paths.

As is shown in FIG. 23, the optical head of this embodiment uses a reflection grating element for the second deflector 22b. This second deflector 22b is arranged in parallel to the optical disk 11 (i.e. in parallel to the y-axis direction). By arranging the second deflector 22b in parallel to the optical disk 11, the thickness of the second deflector 22b in the z-axis direction can be minimized, for example to 0.3 mm, and the optical head of the ninth embodiment can be made even thinner.

The above-mentioned thirteen embodiments refer to optical heads. However, the present invention is not limited to optical heads, and it is needless to say that the same effects can be attained when several optical heads are assembled as an optical head arrangement. Moreover, the objective lens and the collimator lens in these embodiments have been named so for the sake of convenience, and both refer to what is generally known as a lens.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An optical head comprising:

a first grating element and a second grating element arranged in that order in a light path between a light source and an objective lens, the light path including an outgoing light path and a return light path;

a light path alteration member for deflecting light arranged in the light path between said light source and said first grating element, the lowest point of said objective lens being lower than the highest position of light which is emitted from said light source and which is incident on said light path alteration member in a height direction from said objective lens toward an optical recording medium of the optical head, or in the light path between said second grating element and said objective lens, the lowest point of said objective lens being lower than the highest position of light which is emitted from said light source and which is incident on said first grating element in the height direction from said objective lens toward the optical recording medium of the optical head; and a photo-detector for detecting light reflected by the optical recording medium and deflected again by said light path alteration member, wherein light deflected by said light path alteration member is used as incident light on said first grating element or said objective lens on the outgoing light path, and is used as incident light on said photo-detector or said second grating element on the return light path.

2. The optical head according to claim 1, wherein the light path alteration member is arranged in the light path between the light source and the first grating element;

light emitted from said light source is deflected by said light path alteration member and then enters said first grating element;

light diffracted by said first grating element enters the second grating element; and light diffracted by said second grating element enters the objective lens and is focused on a recording medium.

3. The optical head according to claim 2, wherein the first grating element is a reflection element;

the light path alteration member is a first transparent substrate having a first surface;

the first grating element and said light path alteration member are arranged so that an angle defined by the optical axis of light emitted from the light source and a normal on said first surface is at least the critical angle, and an angle defined by the normal on said first surface and the optical axis of light diffracted by said first grating element to said second grating element is smaller than the critical angle;

light emitted from said light source is reflected from said first surface and enters said first grating element; and light reflected and diffracted by said first grating element passes said first surface and enters said second grating element.

4. The optical head according to claim 1, wherein an optical axis change of the light diffracted by the first grating element due to wavelength variation is at least partially cancelled out by an optical axis change of the beam diffracted by the second grating element.

5. The optical head according to claim 1, wherein the first grating element and the second grating element are linear grating elements with the same uniform grating period.

6. The optical head according to claim 1, wherein the first grating element and the second grating element are volume holograms having a periodic refractive index distribution.

7. The optical head according to claim 6, wherein light entering the volume holograms is S-polarized light on both the outgoing light path and the return light path.

8. The optical head according to claim 1, wherein the diffraction angles of the first grating element and the second grating element are at least 45°.

9. An optical head comprising:
a first grating element and a second grating element arranged in that order in a light path between a light source and an objective lens, the light path including an outgoing light path and a return light path;
a light path alteration member for deflecting light arranged in the light path between said light source and said first grating element, wherein light emitted from said light source is deflected by said light path alteration member and then enters said first grating element, light diffracted by said first grating element enters the second grating element, and light diffracted by said second grating element enters the objective lens and is focused on a recording medium; and
a photo-detector for detecting light reflected by the optical recording medium and deflected again by said light path alteration member,
wherein light deflected by said light path alteration member is used as incident light on said first grating element or said objective lens on the outgoing light path, and is used as incident light on said photo-detector or said second grating element on the return light path, and
wherein the first grating element is a reflection element;
the light path alteration member is a first transparent substrate having a first surface;
the first grating element and said light path alteration member are arranged so that an angle defined by the optical axis of light emitted from the light source and a normal on said first surface is at least the critical angle, and an angle defined by the normal on said first surface and the optical axis of light diffracted by said first grating element to said second grating element is smaller than the critical angle;
light emitted from said light source is reflected from said first surface and enters said first grating element;
light reflected and diffracted by said first grating element passes said first surface and enters said second grating element; and wherein
the first transparent substrate is a triangular prism having a slanted face, a bottom face and a side face;
said slanted face is the first surface;
the first grating element is provided on said bottom face; and
light emitted from the light source enters said first transparent substrate through said side face.

10. The optical head according to claim 9, wherein
the second grating element is a transmission element;
said optical head further comprises a second transparent substrate, having an upper face on which said second grating element is formed;
a multi-layered film is formed on the first surface of the first transparent substrate; and
said first transparent substrate and said second transparent substrate are integrated into one component by said multi-layered film.

11. The optical head according to claim 9, wherein
the second grating element is a transmission element;
said optical head further comprises a second transparent substrate, having an upper face on which said second grating element is formed; and
an air gap is provided between said first transparent substrate and said second transparent substrate.

12. An optical head comprising:
a first grating element and a second grating element arranged in that order in a light path between a light source and an objective lens, the light path including an outgoing light path and a return light path;
a light path alteration member for deflecting light arranged in the light path between said light source and said first grating element, the lowest point of said objective lens being lower than the highest position of light which is emitted from said light source and which is incident on said light path alteration member in a height direction from said objective lens toward an optical recording medium of the optical head, and said objective lens is positioned such that light in the outgoing light path enters said objective lens through a side thereof containing the lowest point, or in the light path between said second grating element and said objective lens, the lowest point of said objective lens being lower than the highest position of light which is emitted from said light source and which is incident on said first grating element in the height direction from said objective lens toward an optical recording medium of the optical head, and said objective lens is positioned such that light in the outgoing light path enters said objective lens through the side thereof containing the lowest point; and
a photo-detector for detecting light reflected by an optical recording medium and deflected again by said light path alteration member,
wherein light deflected by said light path alteration member is used as incident light on said first grating element or said objective lens on the outgoing light path, and is used as incident light on said photo-detector or said second grating element on the return light path.

13. An optical head comprising:
a first grating element and a second grating element arranged in that order in a light path between a light source and an objective lens, the light path including an outgoing light path and a return light path;
a light path alteration member for deflecting light arranged in the light path between said light source and said first grating element, the lowest point of said objective lens being lower than the highest position of light which is emitted from said light source and which is incident on said light path alteration member in a height direction from said objective lens toward an optical recording medium of the optical head, and the lowest point of said objective lens faces the outgoing light path, or in the light path between said second grating element and said objective lens, the lowest point of said objective lens being lower than the highest position of light which is emitted from said light source and which is incident on said first grating element in the height direction from said objective lens toward an optical recording medium of the optical head, and the lowest point of said objective lens faces the outgoing light path; and
a photo-detector for detecting light reflected by an optical recording medium and deflected again by said light path alteration member, wherein light deflected by said light path alteration member is used as incident light on said first grating element or said objective lens on the outgoing light path, and is used as incident light on said photo-detector or said second grating element on the return light path.

14. The optical head according to claim 6, further comprising a polarizing focus/track error signal detection element, wherein the amplitude of the spatial modulation of the refractive index in the volume holograms is adjusted so that the product of a first-order diffraction efficiency of S-polarized light and a first-order diffraction efficiency of P-polarized light is maximized.

15. The optical head according to claim 9, wherein the second granting element is a transmission element;

said optical head further comprises a second transparent substrate, having an upper face on which said second grating element is formed; and said second transparent substrate is a triangular prism.

16. The optical head according to claim 1, further comprising a polarizing focus/ track error signal detection element; and a ¼ wavelength plate arranged in a light path between the second grating element and the objective lens.

17. The optical head according to claim 9, wherein the second grating element is a reflection element;

said optical head further comprises a second transparent substrate, having a lower face on which said second grating element is formed;

a multi-layered film is formed on the first surface of the first transparent substrate;

said first transparent substrate and said second transparent substrate are integrated into one component by said multi-layered film; and said first grating element and said second grating element are arranged on the same plane.

18. The optical head according to claim 1, wherein the first grating element and the second grating element are provided on the same transparent substrate.

19. The optical head according to claim 18, wherein the first grating element and the second grating element are provided on the same plane on the same transparent substrate.

20. The optical head according to claim 19, wherein the first grating element and the second grating element are provided on the same surface of the transparent substrate.

21. The optical head according to claim 20, wherein a triangular prism is arranged on the transparent substrate, having a lower face that opposes the first grating element, and a slanted face of said triangular prism is the light path alteration member.

22. The optical head according to claim 20, wherein a reflection plate is arranged on a back face side of the transparent substrate, separated therefrom by an air layer; and light diffracted from said transparent substrate into said air layer is reflected from said reflection from said reflection plate and enters the second grating element.

23. The optical head according to claim 1, wherein the second grating element converts parallel light into divergent light and divergent light into parallel light.

24. The optical head according to claim 1, wherein the first grating element and the second grating element comprise multi-layered volume holograms, each layer corresponding to a different wavelength.

25. The optical head according to claim 24, wherein the thickness of each layer in the multi-layered volume hologram corresponds to a different wavelength.

26. The optical head according to claim 25, wherein the thickness of each layer in the multi-layered volume hologram is substantially proportional to different a wavelength.

27. The optical head according to claim 24, wherein each layer in the multi-layered volume hologram has fringes with periodic refractive index distributions and different inclination angles.

28. The optical head according to claim 24, wherein the multi-layered volume holograms have fringes with periodic index distributions and identical inclination angles.

29. The optical head according to claim 24, wherein the first grating element and the second grating element comprise two-layered volume holograms, each of the two layers corresponding to one of the two wavelengths $\lambda_1$ and $\lambda_2$ characterized by $0.60\mu m \leq \lambda_1 \leq 0.68\mu m$ and $0.76\mu m \leq \lambda_2 \leq 0.87\mu m$.

30. The optical head according to claim 24, wherein the first grating element and the second grating element comprise three-layered volume holograms, each of the three layer corresponding to one of the three wavelengths $\lambda_1$, $\lambda_2$ and $\lambda_3$ characterized by $0.38\mu m \leq \lambda_1 \leq 0.52\mu m$, $0.60\mu m \leq \lambda_2 \leq 0.68\mu m$ and $0.76\mu m \leq \lambda_3 \leq 0.87\mu m$.

31. The optical head according to claim 2, wherein a first incidence angle defined by the optical axis of a laser beam travelling from the light path alteration member to the first grating element and the normal on the first grating element is larger than an outgoing angle defined by the optical axis of diffracted light from the first grating element and the normal on the first grating element, and a second incidence angle defined the by optical axis of the laser beam from the first grating element entering the second grating element and the normal on the second grating element is larger than an outgoing angle defined by the normal on the second grating element and the optical axis of light diffracted by the second grating element.

32. The optical head according to claim 31, wherein the outgoing angles of light diffracted by the first grating element and the second grating element are substantially 0°.

33. The optical head according to claim 31, further comprising:

a first transparent substrate and a second transparent substrate, the second grating element being formed on the upper face or the lower face of the second transparent substrate;

wherein said first transparent substrate and said second transparent substrate are integrated into one component by the frist grating element.

34. The optical head according to claim 31, wherein the first incidence angle and the second incidence angle are 45° to 60°.

* * * * *

UNITED STATES PATENT AND TRADEMARK OFFICE
CERTIFICATE OF CORRECTION

PATENT NO.    : 6,487,016 B1
DATED         : November 26, 2002
INVENTOR(S)   : Shiono et al.

Page 1 of 1

It is certified that error appears in the above-identified patent and that said Letters Patent is hereby corrected as shown below:

Column 25,
Line 14, "granting element" should read -- grating element --

Column 26,
Line 13, "different a wavelength" should read -- a different wavelength --

Signed and Sealed this

Twelfth Day of August, 2003

JAMES E. ROGAN
*Director of the United States Patent and Trademark Office*